United States Patent
Canpolat et al.

(10) Patent No.: US 11,350,299 B2
(45) Date of Patent: May 31, 2022

(54) RECEIVED SIGNAL STRENGTH INDICATOR THRESHOLDS FOR TRANSITIONS

(71) Applicant: Intel Corporation, Santa Clara, CA (US)

(72) Inventors: Necati Canpolat, Beaverton, OR (US); Carlos Cordeiro, Portland, OR (US); Laurent Cariou, Milizac (FR)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 16/496,898

(22) PCT Filed: May 2, 2018

(86) PCT No.: PCT/US2018/030589
§ 371 (c)(1),
(2) Date: Sep. 23, 2019

(87) PCT Pub. No.: WO2018/204457
PCT Pub. Date: Nov. 8, 2018

(65) Prior Publication Data
US 2021/0297883 A1    Sep. 23, 2021

Related U.S. Application Data

(60) Provisional application No. 62/500,252, filed on May 2, 2017.

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04W 76/11* (2018.02); *H04W 84/12* (2013.01)

(58) Field of Classification Search
CPC ..... H04W 84/12; H04W 84/14; H04W 84/18; H04W 24/02; H04W 24/04; H04W 88/08;
(Continued)

(56) References Cited

U.S. PATENT DOCUMENTS 9,402,238 B1 * 7/2016 Sun ..................... H04W 52/243
2006/0056448 A1 * 3/2006 Zaki .................. H04W 36/0066
370/466
(Continued)

FOREIGN PATENT DOCUMENTS

| JP | 2008131587 | 6/2008 |
|---|---|---|
| WO | 2014193354 | 12/2014 |
| WO | 2015171926 | 11/2015 |

OTHER PUBLICATIONS

"European Application Serial No. 18795220.5 Response filed Jun. 9, 2020 to Communication pursuant to Rules 161(1) and 162 EPC filed Dec. 10, 2019", 8 pgs.
(Continued)

*Primary Examiner* — Jean A Gelin
(74) *Attorney, Agent, or Firm* — Schwegman Lundberg & Woessner, P.A.

(57) ABSTRACT

Apparatuses, computer readable media, and methods for received signal strength indicator (RSSI) thresholds for transitions are disclosed. An apparatus comprising processing circuitry is disclosed, where the processing circuitry is configured to associate with a first access point (AP), the first AP being part of an extended service set (ESS), decode a frame from the first AP, the frame including an ESS report element, the ESS report element including a recommended basic service set (BSS) transition threshold within the ESS field, and decode a beacon frame from the first AP. The processing circuitry may be further configured to respond to a measured RSSI of the beacon frame being below a value
(Continued)

indicated by the recommended BSS transition threshold within the ESS field, by initiating a transition to a second AP.

21 Claims, 16 Drawing Sheets

(51) Int. Cl.
*H04W 76/11* (2018.01)
*H04W 84/12* (2009.01)

(58) Field of Classification Search
CPC ............. H04W 88/04; H04W 74/0426; H04W 52/0206; H04W 36/08; H04W 36/0005; H04W 48/20; H04W 24/10; H04W 76/11; H04B 17/38
See application file for complete search history.

(56) References Cited

U.S. PATENT DOCUMENTS

| | | | |
|---|---|---|---|
| 2006/0268756 A1 | 11/2006 | Wang et al. | |
| 2008/0123607 A1 | 5/2008 | Jokela | |
| 2008/0198811 A1 | 8/2008 | Deshpande et al. | |
| 2011/0130149 A1 | 6/2011 | Yao et al. | |
| 2015/0139010 A1 | 5/2015 | Jeong et al. | |
| 2015/0245358 A1* | 8/2015 | Schmidt | H04L 43/0888 370/329 |
| 2015/0350974 A1 | 12/2015 | Patil et al. | |
| 2016/0066225 A1 | 3/2016 | Zhu et al. | |
| 2016/0073429 A1* | 3/2016 | Oteri | H04W 4/08 370/338 |
| 2016/0165630 A1* | 6/2016 | Oteri | H04W 74/04 370/336 |
| 2017/0019925 A1* | 1/2017 | Agardh | H04W 74/0816 |
| 2017/0290057 A1* | 10/2017 | Fang | H04B 7/15542 |
| 2018/0092078 A1* | 3/2018 | Fang | H04B 7/022 |
| 2018/0124792 A1* | 5/2018 | Khoshnevisan | H04B 17/345 |
| 2018/0270038 A1* | 9/2018 | Oteri | H04L 5/0037 |
| 2019/0208502 A1* | 7/2019 | Du | H04W 52/02 |
| 2020/0007823 A1* | 1/2020 | Ophir | H04N 21/6377 |

OTHER PUBLICATIONS

"International Application Serial No. PCT/US2018/030589, International Preliminary Report on Patentability dated Nov. 14, 2019", 11 pgs.

"European Application Serial No. 18795220.5, Extended European Search Report dated Dec. 7, 2020", 11 pgs.

Eldad, Perahia, "client management", IEEE Draft; 11-17-0619-00-00AX-Client-Management, IEEE-SA Mentor, Piscataway, NJ USA vol. 802.11ax, (Apr. 25, 2017), 1-6.

Eldad, Perahia, "client management", IEEE Draft; 11-17-0619-07-00AX-Client-Management, IEEE-SA Mentor, Piscataway, NJ USA vol. 802.llax, No. 7, (Sep. 11, 2017), 1-7.

Mustana, N, "Pre-scanning and dynamic caching for fast handoff at MAC layer in IEEE 802.11 wireless LANs", Mobile Adhoc and Sensor Systems Conference, (Nov. 7, 2005), 115-122.

"International Application Serial No. PCT/US2018/030589, International Search Report dated Aug. 30, 2018", 3 pgs.

"International Application Serial No. PCT/US2018/030589, Written Opinion dated Aug. 30, 2018", 9 pgs.

Eldad, Perahia, et al., "Proposed Text Changes for Client Management", IEEE 802.11 -17/0619r0, (Apr. 25, 2017), 4-5.

"European Application Serial No. 18795220.5, Response filed Jun. 23, 2021 to Extended European Search Report dated Dec. 7, 2020", 19 pgs.

* cited by examiner

| MANAGED ESS | EDGE OF ESS | PER AP TRANSITION THRESHOLD | PER AP SCANNING THRESHOLD | TRANSITION THRESHOLD OUTSIDE ESS | SCANNING THRESHOLD OUTSIDE ESS | STANDARD TRANSITION THRESHOLD WITHIN ESS | STANDARD SCANNING THRESHOLD WITHIN ESS |
|---|---|---|---|---|---|---|---|
| 2002 | 2004 | 2006 | 2008 | 2010 | 2012 | 2014 | 2016 |

RECEIVED SIGNAL STRENGTH INDICATOR THRESHOLDS FOR TRANSITIONS

PRIORITY CLAIM

This application is a U.S. National Stage Filing under 35 U.S.C. 371 from International Application No. PCT/US2018/030589, filed May 2, 2018 and published in English as WO 2018/204457 on Nov. 8, 2018, which claims the benefit of priority to U.S. Provisional Patent Application Ser. No. 62/500,252, filed May 2, 2017, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to multi-band operation (MBO) standards. Some embodiments relate to methods, computer readable media, and apparatus for received signal strength indicator (RSSI) threshold for transitions.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 20 illustrates ESS information in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
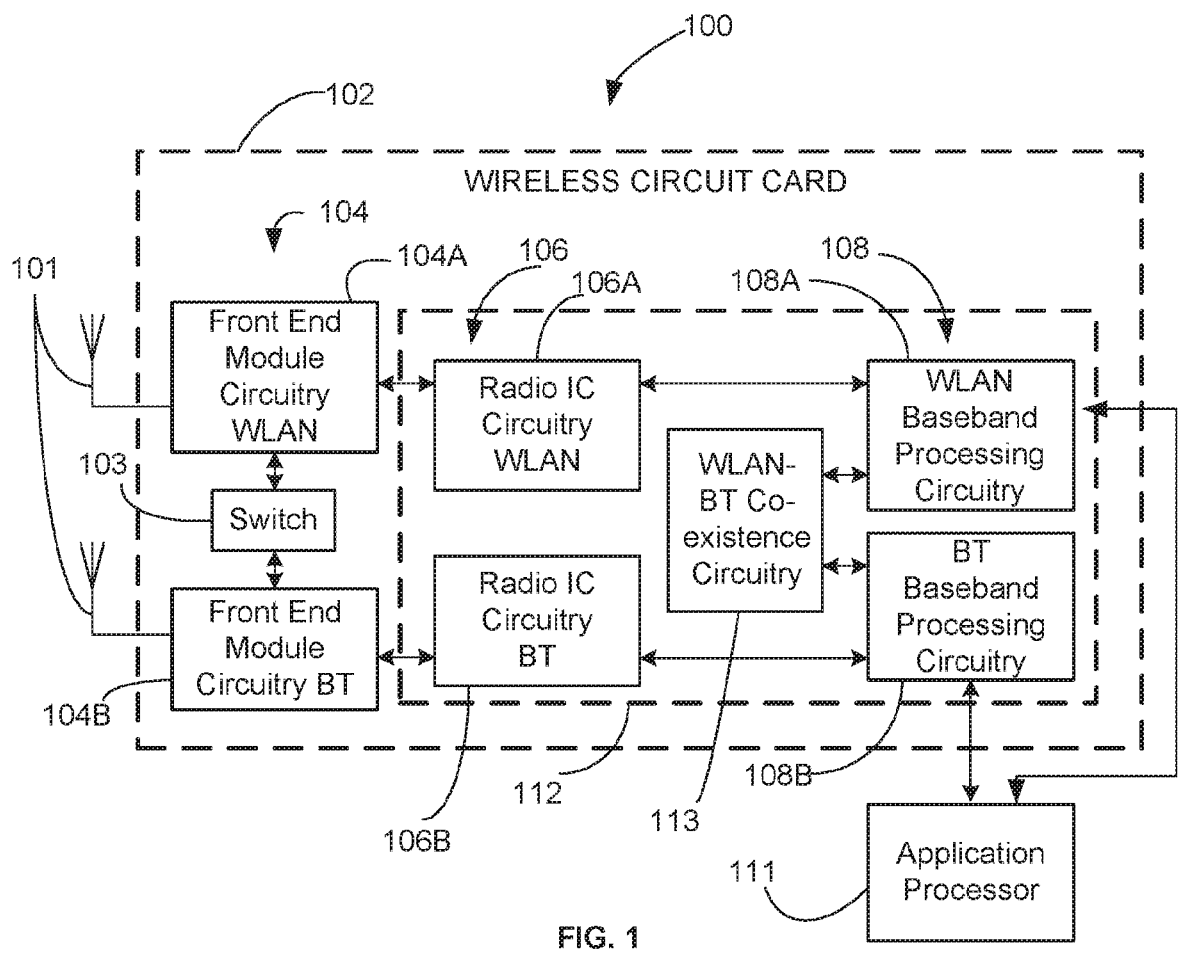
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless AP, a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
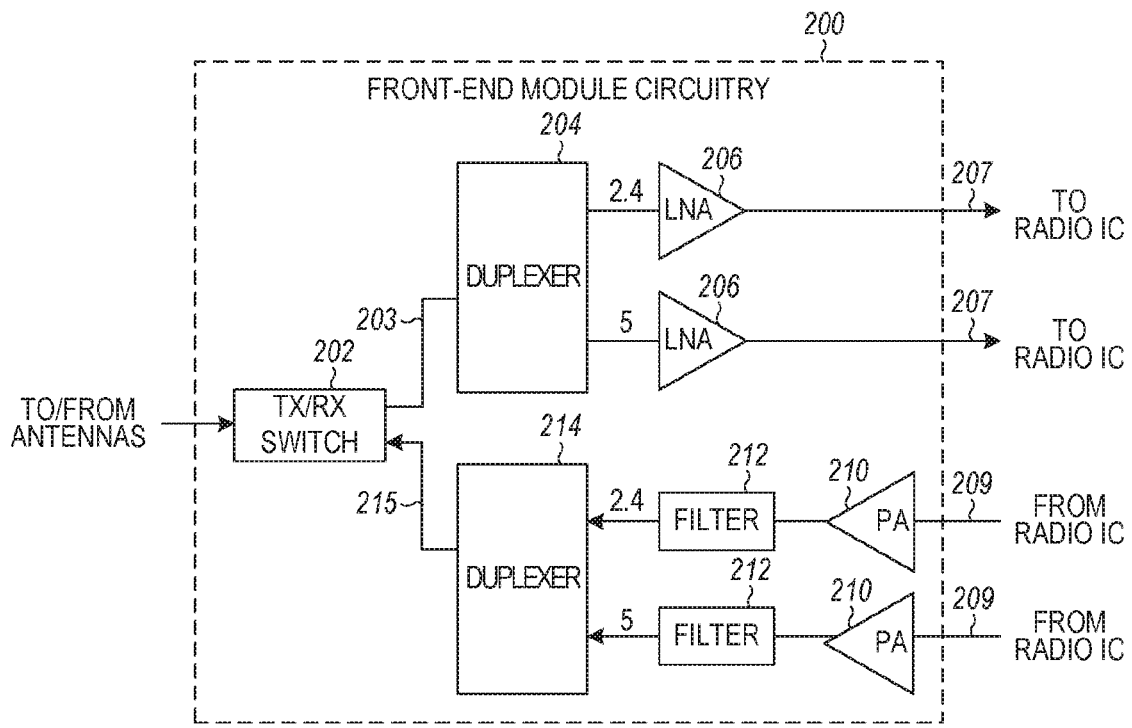
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
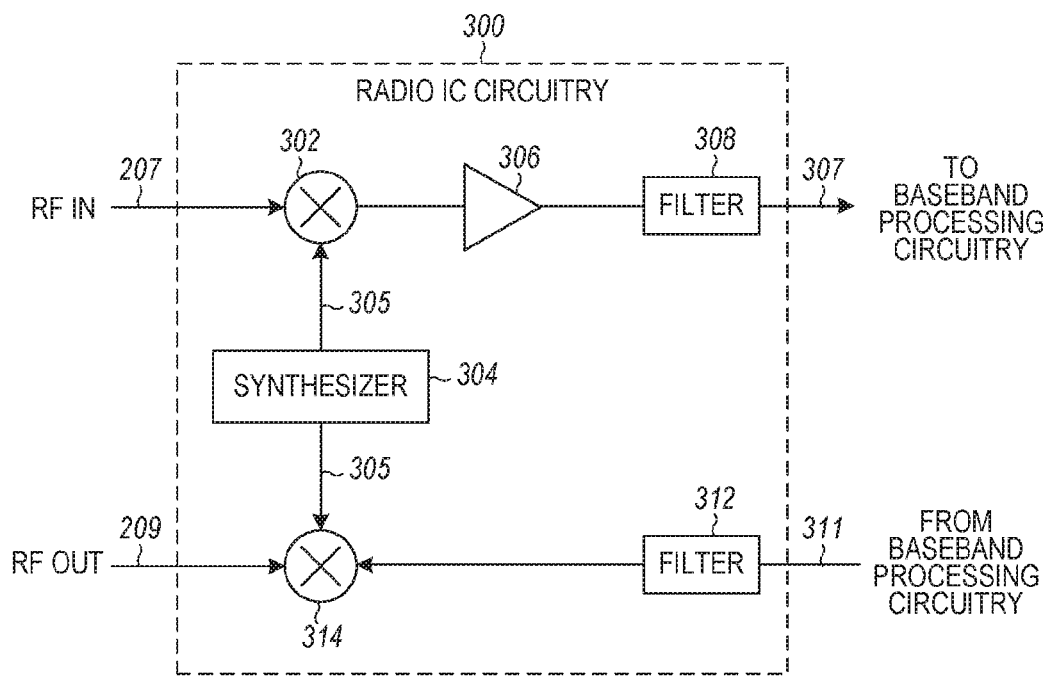
FIG. 3 illustrates a radio integrated circuitry (IC) for use in the radio architecture of FIG. 1 in accordance with some embodiments.

FIG. 3 illustrates radio integrated circuitry (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
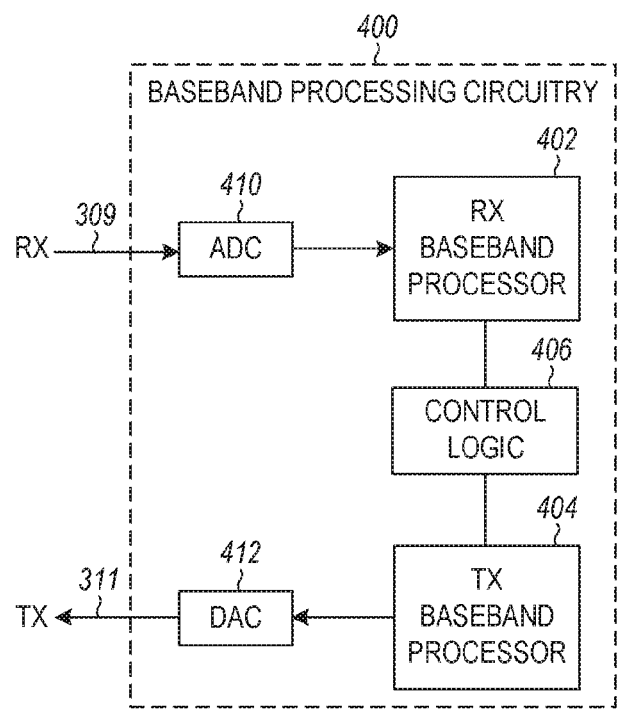
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
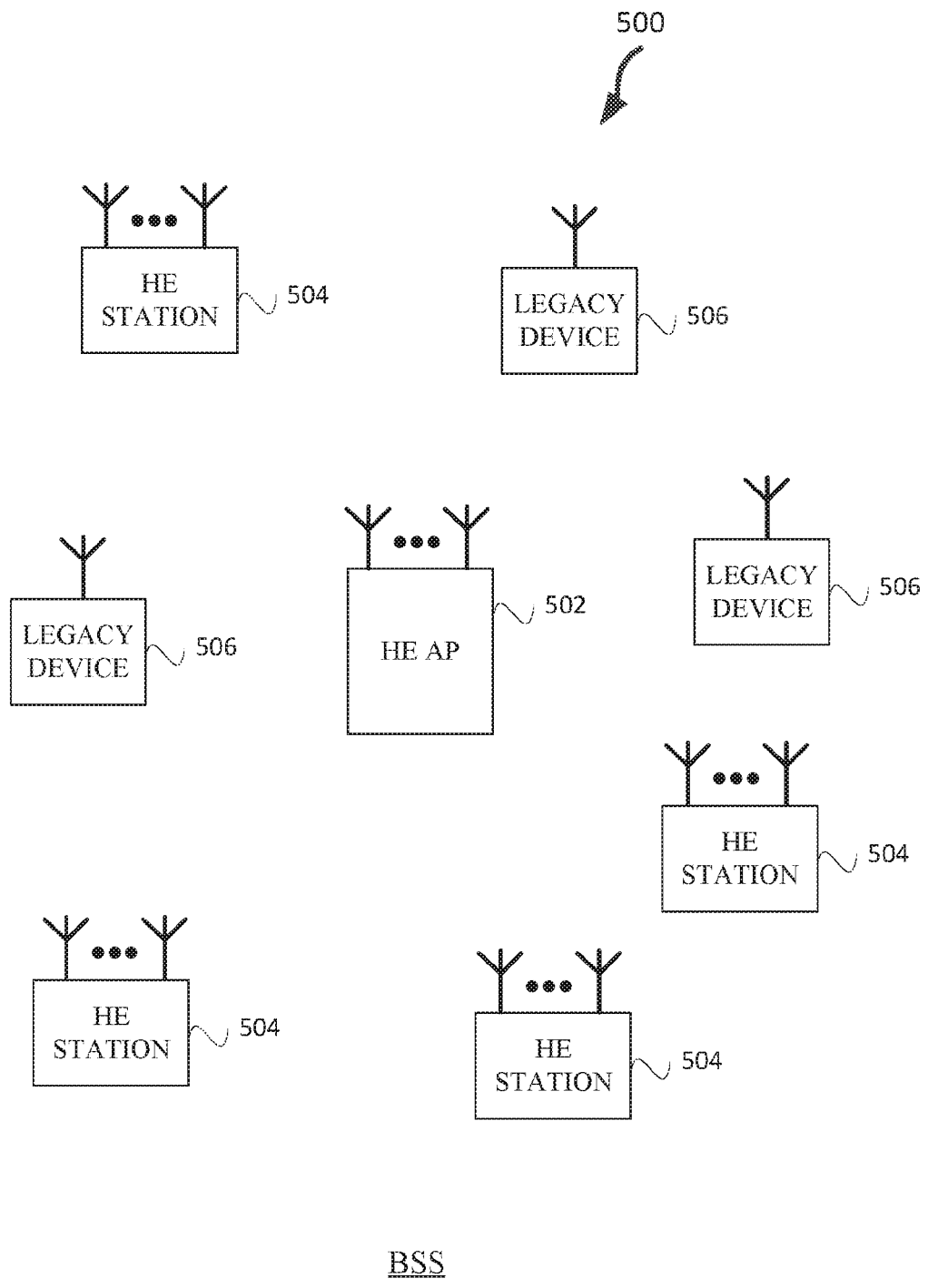
FIG. 5 illustrates a WLAN in accordance with some embodiments.

FIG. 5 illustrates a WLAN 500 in accordance with some embodiments. The WLAN 500 may comprise a basis service set (BSS) that may include a HE AP 502, which may be an AP, a plurality of high-efficiency wireless (e.g., IEEE 802.11ax) (HE) stations 504, and a plurality of legacy (e.g., IEEE 802.11n/ac) devices 506. The HE AP 502 and/or HE stations 504 may be configured for multi-bandwidth operation (MBO).

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an ESS. A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz. 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN). IEEE 802.16 (i.e., Worldwide interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-22.

In example embodiments, the HE station 504 and/or the HE AP 502 are configured to perform the methods and operations/functions described herein in conjunction with FIGS. 1-22. In example embodiments, an apparatus of the HE station 504 and/or an apparatus of the HE AP 502 are configured to perform the methods and functions described herein in conjunction with FIGS. 1-22. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
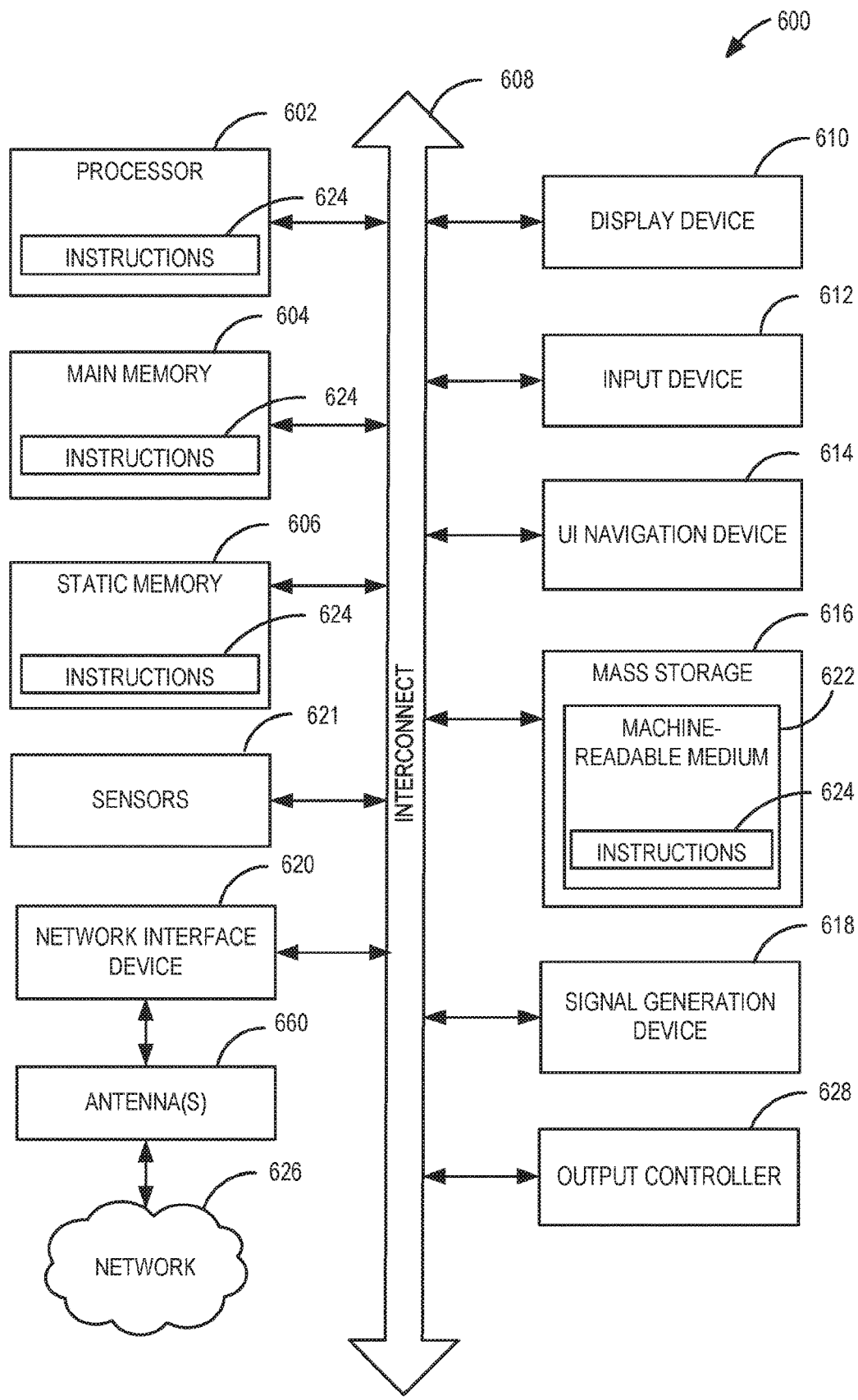
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor

602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media, in some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
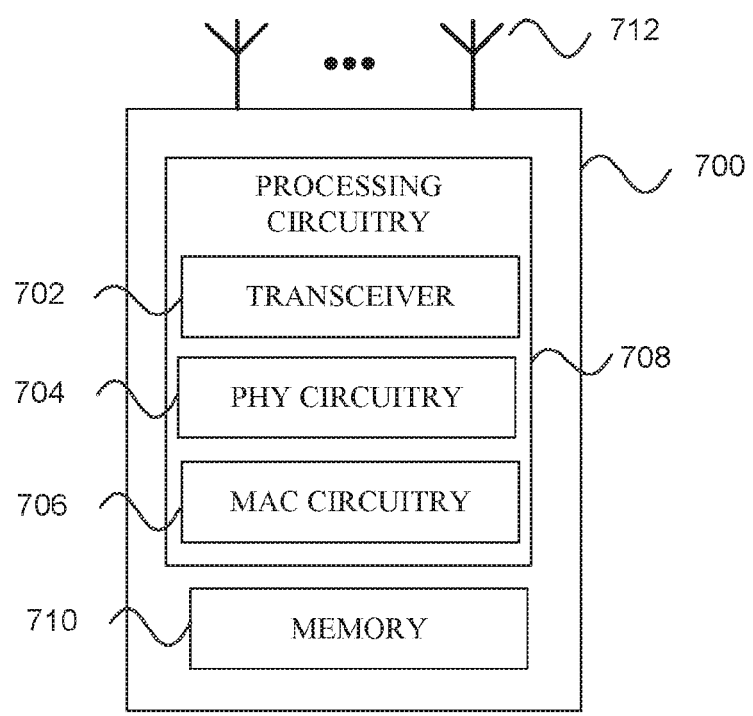
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
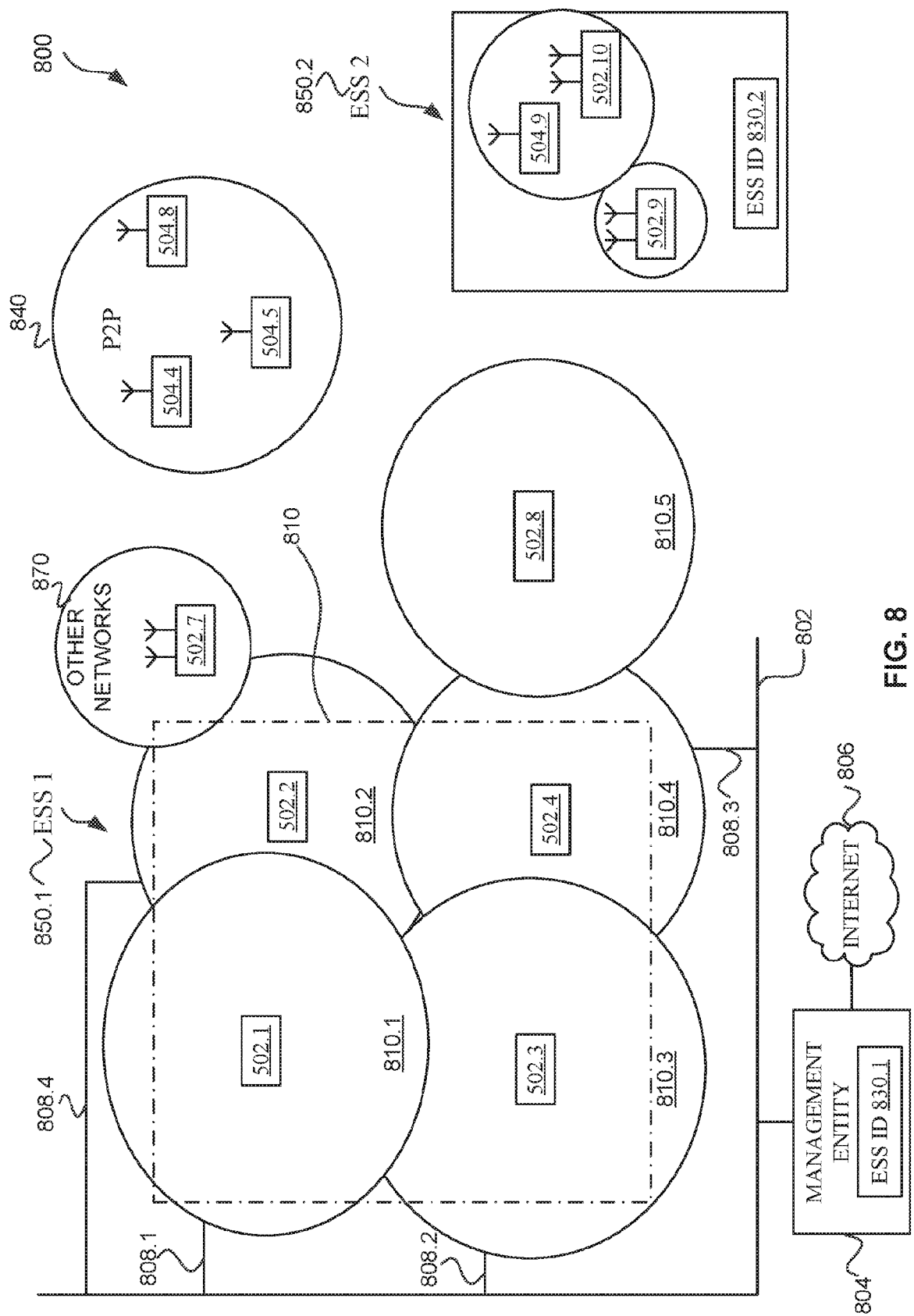
FIG. 8 illustrates a wireless network in accordance with some embodiments.

FIG. 8 illustrates a wireless network 800 in accordance with some embodiments. Illustrated in FIG. 8 is extended service set (ESS) 1 850.1, other networks 870, BSSs 500, ESS 2 850.2, APs 502, management entity 804, Internet 806, and peer-to-peer (P2P) network 840. In some embodiments, the wireless network 800 represents different networks that are available in a high density area, e.g., a football stadium.

A management domain may be a portion of the wireless network 800 that is managed by a management entity 804. The ESS 1 850.1 comprises four BSSs 810.1, 810.2, 810.3, and 810.4. The APs 502.1, 502.2, 502.3, and 502.3 are part of their respective BSSs 810.1, 810.2, 810.3, and 810.4. In some embodiments, the APs 502.1, 502.2, 502.3, and 502.4 are coupled to a distribution system (DS) 802 through communication links 808.1, 808.2, 808.3, and 808.4. The DS 802 may be any technology that provides the appropriate services to the ESS 850.1. For example, the DS 802 may be Ethernet cables or wireless connections. The communication links 808 may be cables or wireless links. The BSSs 810.1, 810.2, 810.3, and 810.4 may include additional APs 502, HE stations 504 (associated with the BSSs 810 or within the BSSs 810), and/or legacy devices 506 (associated with the BSSs 810 or within the BSSs 810). The circles represent a signal range of the BSSs 810 or the APs 502, e.g., a RSSI of a beacon frame received by a HE station 504 (not illustrated in FIG. 8) may be below −82 dBm (other values be used, e.g., recommended BSS transition threshold ESS 1808 of FIG. 18) outside the circle of the BSS 810.

The management entity 804 may be a router that routes packets based on destination addresses. The management entity 804 may include functionality for managing ESS 1 850.1 such as recommended BSS transition threshold ESS 1808 and/or other parameters of the ESS information 1708. In some embodiments, the management entity 804 may not manage parameters of the ESS information 1708.

The management entity 804 may transmit ESS information 1708 parameters to one or more of the HE APs 502.1, 502.2, 502.3, 502.4, and/or HE stations 504 (not illustrated in FIG. 8) that are part of the BSSs 500.1, 500.2, 500.3, and 500.4. In some embodiments, the management entity 804 or different portions of the management entity 804 may reside on different devices, e.g., one of the HE APs 502, a router, a device in the internet 806, a server, etc. In some embodiments, the management entity 804 may manage additional networks such as other networks 870. The management entity 804 may receive or coordinate ESS information 1708 with other management entities (not illustrated.)

Figure 15:
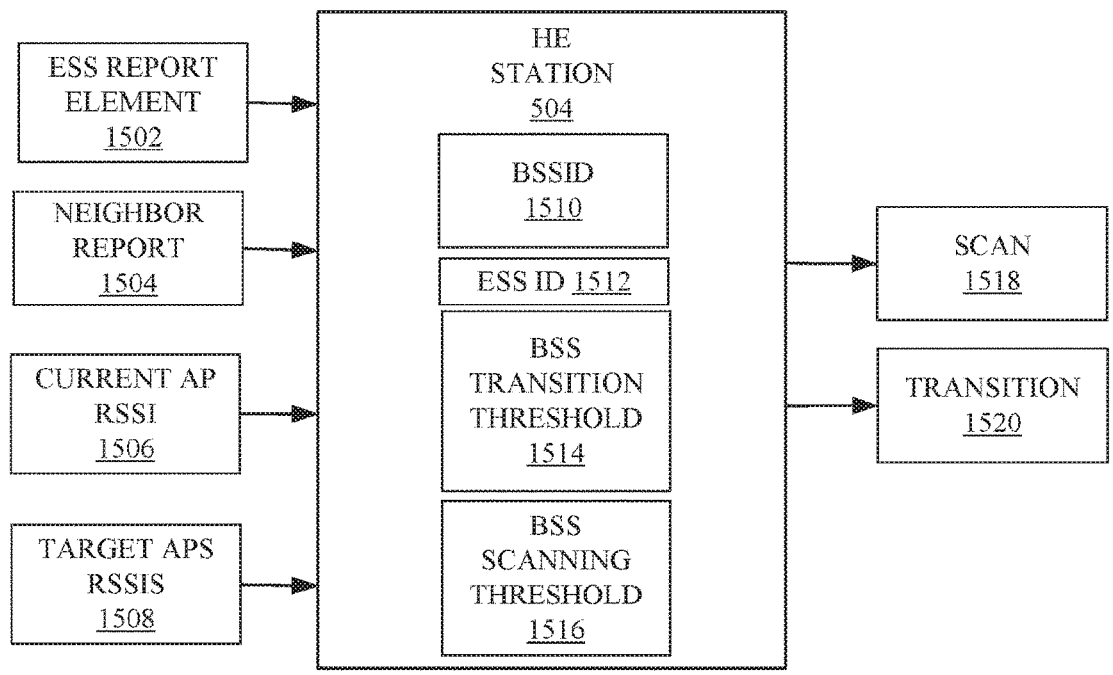
FIG. 15 illustrates an HE station in accordance with some embodiments.

The internet 806 may be an interconnected network such as the Internet. The HE APs 502 each have a basic service set identifier (BSSID) 1510 (FIG. 15). In some embodiments, the BSSIDs 1510 are assigned to the HE APs 502 by the management entity 804. In some embodiments, management entity 804 generate BSSIDs for HE APs 502 and/or ESS information 1708 for HE APs 504 and/or HE stations 502.

In some embodiments, the HE APs 502 generate a BSSID (e.g. 1510). In some embodiments, the BSSIDs (e.g., 1510) are assigned to the HE AP 502 by a manufacturer.

In some embodiments, the HE APs 502.1, 502.2, 502.3, and 502.4 each have a BSS color (not illustrated). In some embodiments, the BSS color is assigned to the HE APs 502.1, 502.2, 502.3, and 502.4 from the management entity 804. In some embodiments, the HE APs 502.1, 502.2, 502.3, and 502.4 generate a BSS color. In some embodiments the management entity 804 may manage BSS colors between different ESSs 850.

The BSSs 500.1, BSS 500.2, BSS 500.3, and BSS 500.4 may be part of a planned ESS or managed ESS (managed ESS 1804, 1904, 2002) with an Extended Service Area (ESA) 810. The ESS 850 may be deployed to ensure blanket cover over the ESA 810, e.g., the BSSs 810.1, BSS 810.2, BSS 810.3, and BSS 810.4 may overlap with one another.

The ESA 810 may have neighbor reports (e.g., 1400 or 1408 of FIG. 14) associated with it that may be used by HE APs 502 and/or HE stations 504 to determine RSSI thresholds for scanning, transitions, and/or to determine another HE AP 502 to transition to.

In accordance with some embodiments, HE APs 502 that are part of the same ESS 850 may be termed neighbor access points to other HE APs 502 of the same ESS 850. In some embodiments, neighbor access points may be HE APs 502 that have signals that overlap. In example embodiments, the management entity 804 and/or HE APs 502 that are part of the same ESS 850 and/or ESA 810 may share information regarding the ESS information 1710. In example embodiments, the management entity 804 and/or HE APs 502 that are part of the same ESS 850 and/or ESA 810 may share information regarding the RSSI and/or neighbor reports.

In accordance with some embodiments, HE APs 502 may send information regarding the HE AP 502 and BSS 500 to neighbor HE APs 502 or HE APs 502 that are part of the same ESS 850 or ESA 810. The HE APs 502 may be configured to operate on different primary channels (e.g., 1104 of FIG. 11), which in some embodiments may be coordinated or facilitated (e.g., via message passing) by the management entity 804 and/or by messaging between neighboring HE APs 502.

BSS 500.8 may not be part of ESS 1 850.1 or ESS 2 850.2. In some embodiments, HE AP 502.8 may be termed an unmanaged HE AP 502 because it may not be part of a management entity (e.g., management entity 804). Other networks 670 may be other networks that generate signals. For example, other networks 670 may be a Long-Term Evolution (LTE) license assisted access (LAA). P2P network 640 may be a network of HE stations 504 where one or more HE stations 504 are using P2P to communicate and/or one or more of the HE station 504 are operating (e.g, acting as a GO) as APs (e.g., HE AP 502). In some embodiments, the HE stations 504, acting as an HE AP 502, with at least some of the functionality of the HE AP 502, may be termed soft HE APs. ESS 2 850.2 may be similar or the same as ESS 1 850.1. In some embodiments ESS 1 850.1 and ESS 2 850.2 may communicate with one another, e.g. management entity 804 may communicate with a management entity (not illustrated) of ESS 2 850.2; or, ESS 1 850.1 and ESS 2 850.2 may have a common management entity (not illustrated), e.g., there may be a common management entity reachable by both ESS 1 850.1 and ESS 2 850.2.

In some embodiments, the HE station 504.4 and/or an HE AP 502 may use the ESS ID 830.1 of ESS 850.1 (e.g., ESS ID 906, 1018). The HE APs 502 may transmit ESS information 1710 in beacon frames, pre-association frames, probe responses, and/or association (or re-association) requests, in accordance with some embodiments. The HE APs 502 may receive the ESS information (1708) and/or neighbor reports (1408) from a management entity 804 and then transmit them to HE stations 504.

In some embodiments, the HE AP 502 and/or HE stations 504 may be configured to determine if a frame is from a wireless device from a different management entity 804 based on the ESS ID 830 (e.g., 1512, 1624). The ESS ID 830 may be a service set identifier (SSID) in accordance with some embodiments.

Figure 9:
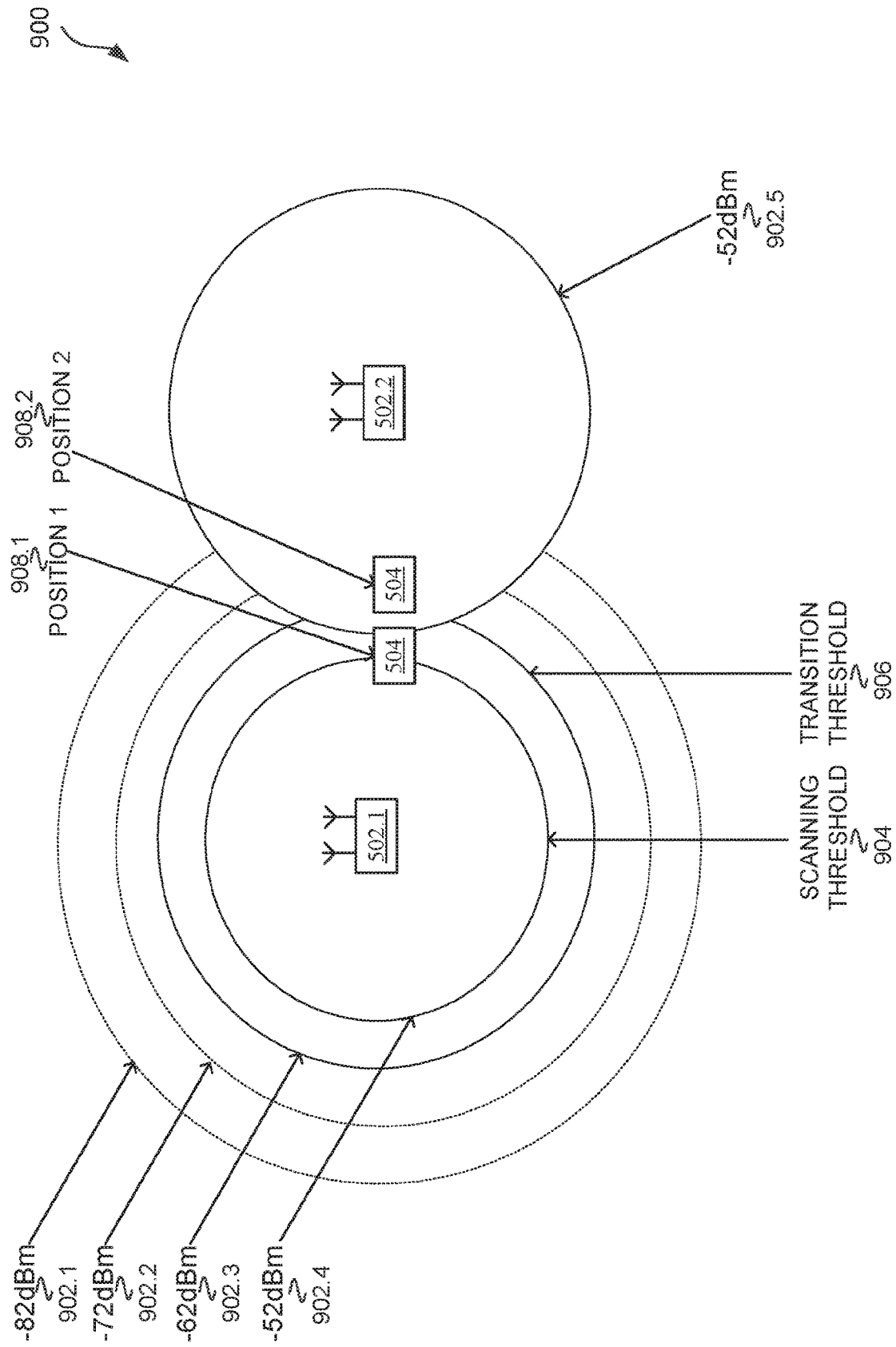
FIG. 9 illustrates thresholds for scanning and transition in accordance with some embodiments.
Figure 10:
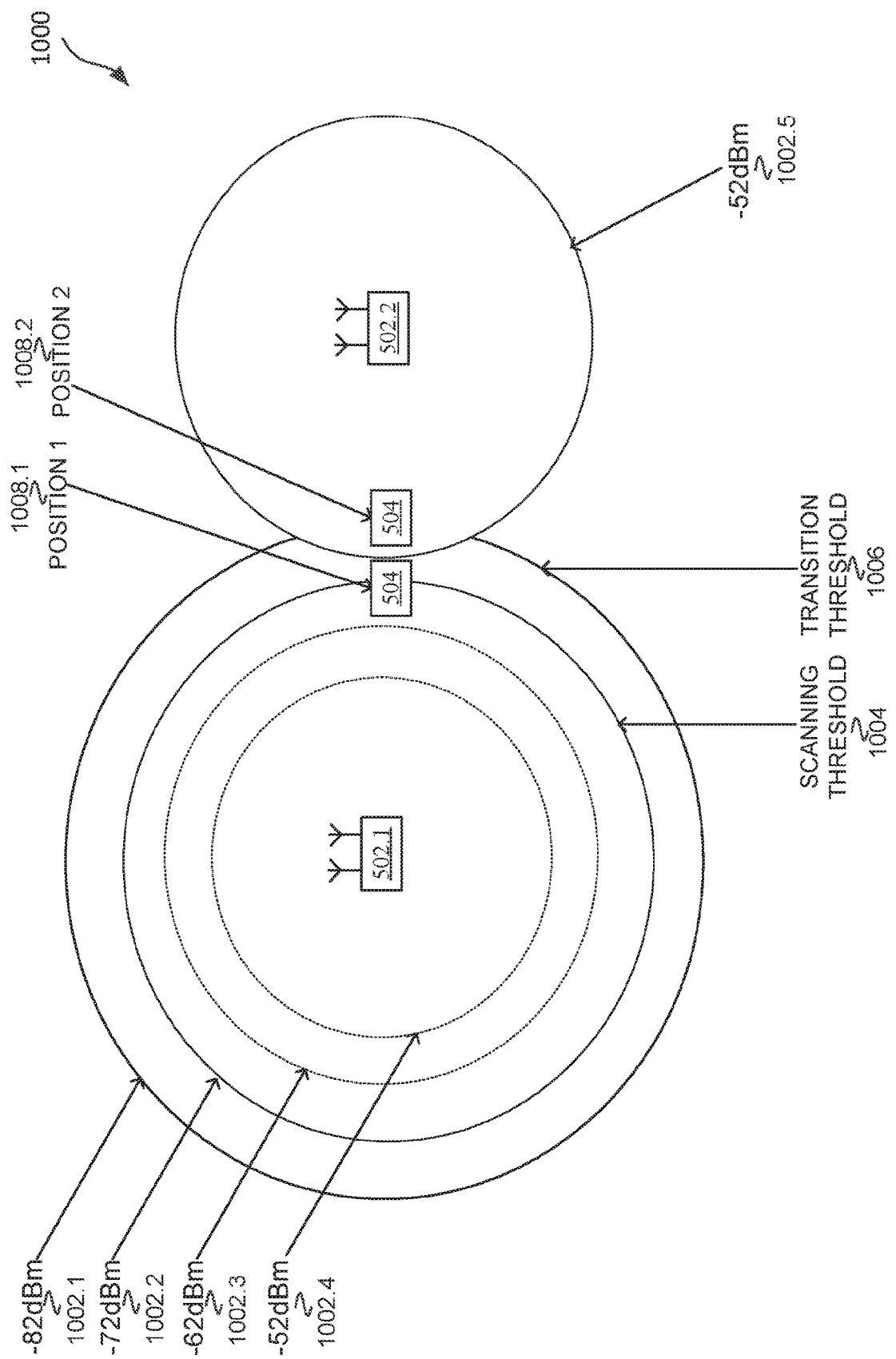
FIG. 10 illustrates thresholds for scanning and transition in accordance with some embodiments.

FIGS. 9 and 10 will be disclosed in conjunction with one another. FIG. 9 illustrates thresholds for scanning and transition 900 in accordance with some embodiments. Illustrated in FIG. 9 are signal threshold areas 902, scanning threshold 904, transition threshold 906, position 1 908.1, position 2 908.2, HE station 504, and HE APs 502.1, 502.2. FIG. 10 illustrates thresholds for scanning and transition 1000 in accordance with some embodiments. Illustrated in FIG. 10 are signal threshold areas 1002, scanning threshold 1004, transition threshold 1006, position 1 1008.1, position 2 1008.2, HE station 504, and HE APs 502.1, 502.2. FIG. 9 may illustrate a situation where HE station 504 moves from position 1 908.1 to position 2 908.2. HE station 504 may transition from HE AP 502.1 to HE AP 502.2. FIG. 10 may illustrate a situation where HE station 504 moves from position 1 1008.1 to position 2 1008.2. HE station 504 may transition from HE AP 502.1 to HE AP 502.2.

FIG. 9 illustrates a more dense deployment where the signals of HE AP 502.2 may be −52 dBm 902.5 where the signals of HE AP 502.1 are −62 dBm 902.3. FIG. 10 illustrates a less dense deployment where the signals of HE AP 502.2 may be −52 dBm 1002.5 where the signals of HE AP 502.1 are −82 dBm 1002.1. FIG. 9 may illustrate a scenario (e.g., a football stadium) where an ESS 850 (e.g., 850.1) has HE AP 502 deployed every 10 meters (or another appropriate spacing) to provide an ESA 810. FIG. 10 may illustrate a less dense deployment (e.g., outdoors) where the HE AP 502 may be spaced every 100 meters or more and be sporadically placed.

HE station 504 may use scanning threshold 904, 1004 (e.g., BSS scanning threshold 1516, recommended BSS scanning threshold ESS 1602, PER AP scanning threshold 1608, scanning threshold outside ESS 1612, standard scanning threshold within ESS 1616, per AP scanning threshold 2008, scanning threshold outside ESS 2012, or standard scanning threshold within ESS 2016) to determine when to start scanning for HE APs 502 to transition to. For example, HE station 504 may start scanning for HE APs 502 to transition to when a measured RSSI of a beacon frame from HE AP 502.1 is below the scanning threshold 904, 1004. HE station 504 may use transition threshold 906 (BSS transition threshold 1514, recommended BSS transition threshold ESS 1604, per AP transition threshold 1606, transition threshold outside ESS 1610, standard transition threshold within ESS 1614, recommended BSS transition threshold ESS 1808, per AP transition threshold 2006, transition threshold outside ESS 2010, or standard transition threshold within ESS 2014) to determine when to transition from HE AP 502.1 to HE AP 502.2.

The HE station 504 may use different scanning thresholds 904, 1004, and transition thresholds 906, 1006 based on how dense the deployment is, based on whether the HE APs 502 are part of a managed or planned HE APs 502 (e.g., managed ESS 1804, 1904, 2002), based on whether an HE AP 502 is an edge of ESS 1806, 1906, 2004, and/or based on one or more neighbor reports 1400.

In some embodiments, the HE station 504 may use a default value for the scanning thresholds 904, 1004, and/or transition thresholds 906, 1006 (e.g., −72 dBm or −82 dBm). A default value may lead the HE station 504 to remain associated (or attached) to a HE AP 502 longer than is efficient in more dense deployments (e.g., FIG. 9). For example, the HE station 504 (e.g., FIG. 9) may remain associated (or attached) with HE AP 502.1 when it would be more efficient to associate (or attach) with HE AP 502.2. For example, with a transition threshold of −82 dBm, HE station 504 may stay attached to HE AP 502.1 when the signal strength of HE AP 502.2 is greater than −52 dBm 902.5.

Figure 11:
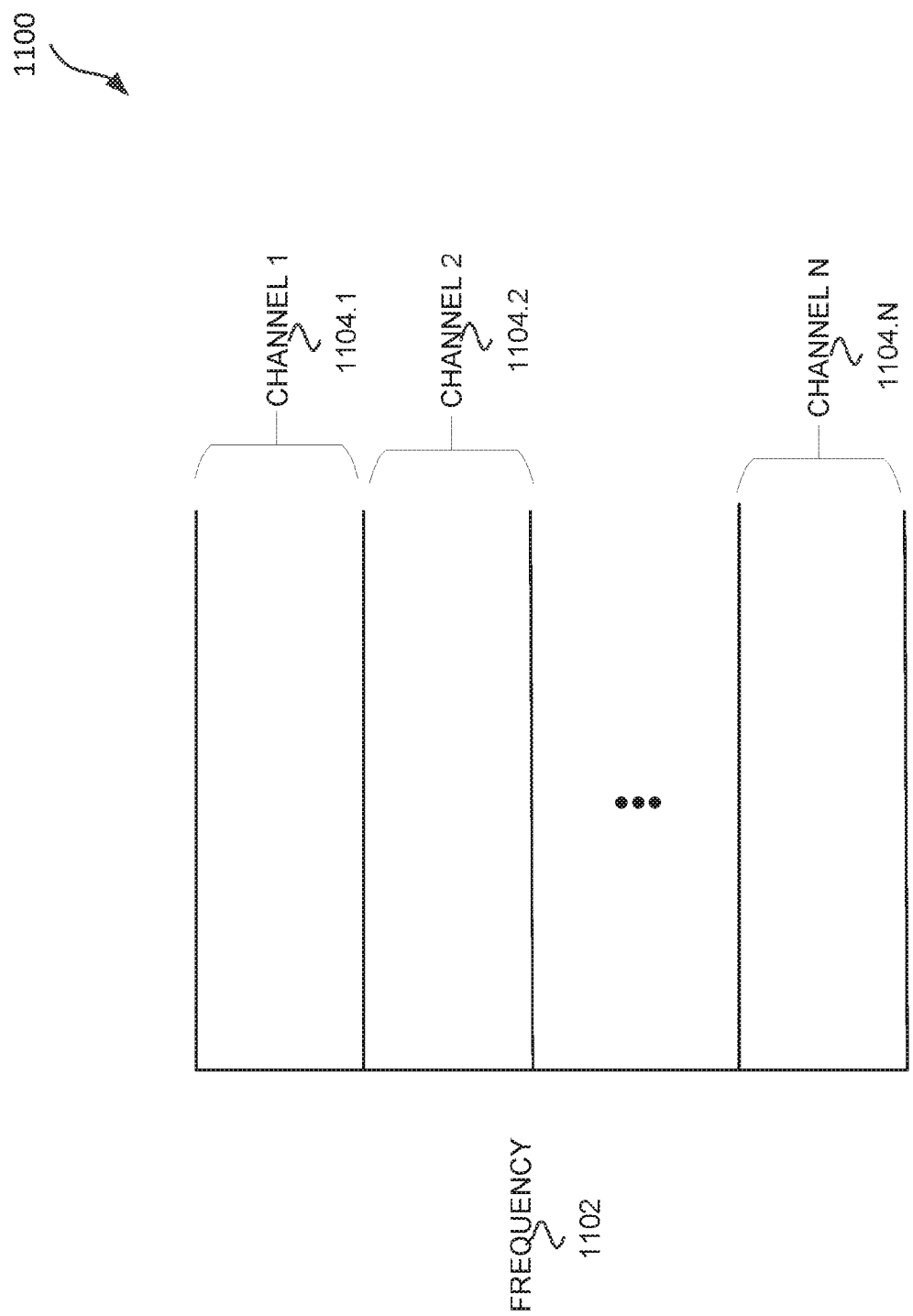
FIG. 11 illustrates primary channels in accordance with some embodiments.

FIG. 11 illustrates primary channels 1104 in accordance with some embodiments. Illustrated in FIG. 11 is frequency 1102 along a vertical axis and channels 1104 along a vertical axis. The frequency 1102 may be divided into channels 1104 may be different primary channels that a HE AP 502 may use for a primary channel for a BSS 810. The channels 1104 may be 20 MHz or another bandwidth. The frequency 1102 may be a bandwidth such as 80 MHz, 160 MHz, 320 MHz, 640 MHz, or another bandwidth. The frequency 1102 may be an operating bandwidth of the BSS 810.

Figure 12:
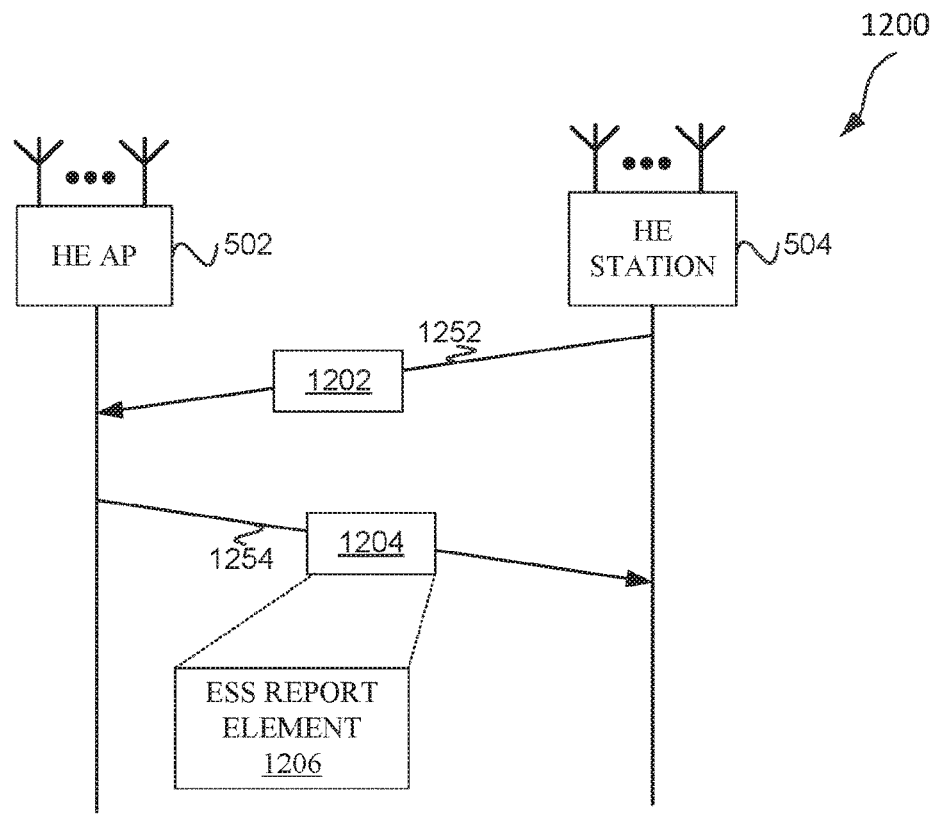
FIG. 12 illustrates a method of a RSSI threshold for transitions in accordance with some embodiments.

FIG. 12 illustrates a method 1200 of a RSSI threshold for transitions in accordance with some embodiments. Illustrated in FIG. 12 is HE AP 502 and HE station 504. The method 1200 may begin at operation 1252 with the HE station 504 transmitting a request 1202 to the HE AP 502. The request 1202 may be an access network query protocol (ANQP) query or another request.

The method 1200 may continue at operation 1254 with the HE AP 502 transmitting a response 1204. The response 1204 may be a neighbor report (e.g., ANQP neighbor report 1400). The neighbor report (e.g., 1400) may include one or more ESS report elements 1206 (e.g., 1700). The ESS report element 1206 may include recommended/required BSS transition threshold (for ESS 804) and/or recommended BSS scanning threshold (for ESS 804) on a per ESS, per BSS 810, and/or per HE AP 502 basis.

The HE station 504 may use the response 1204 to determine when to begin scanning for an HE AP 502 to transition to and/or to determine when to transition to a new HE AP 502. In some embodiments, the request 1202 may be an association, re-association, probe request, BSS management transition (BMT) query. In some embodiments, the response 1204 may be an association response, beacon frame, re-association response, probe response, or BMT response.

Figure 13:
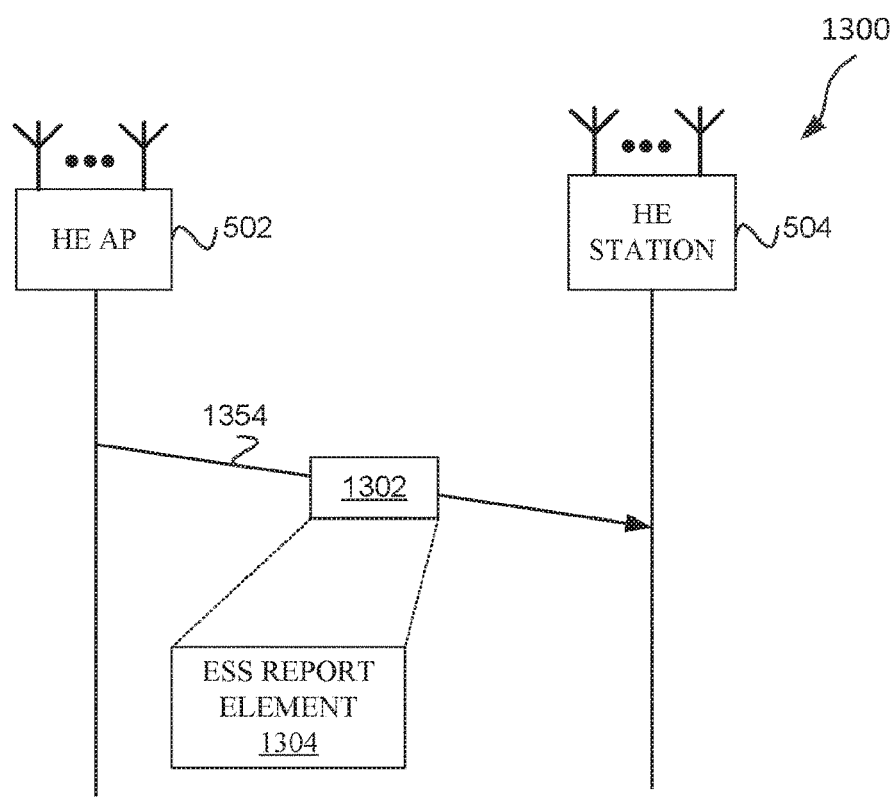
FIG. 13 illustrates a method of a RSSI threshold for transitions in accordance with some embodiments.

FIG. 13 illustrates a method 1300 of a RSSI threshold for transitions in accordance with some embodiments. Illustrated in FIG. 13 is HE AP 502 and HE station 504. The method 1300 may begin at operation 1354 with the HE AP 502 transmitting scanning and/or transition information 1302 to the HE station 504. The scanning and/or transition information 1302 may be an ESS report element 1304 (e.g., 1700). The scanning and/or transition information 1302 may be part of a beacon frame, association response, re-association response, probe response, ANQP neighbor report, or BMT response. The scanning and/or transition information 1302 may include an ESS report element 1304. The ESS report element may include recommended/required BSS transition threshold and/or recommended BSS scanning threshold on a per ESS 804, per BSS 810, and/or per HE AP 502 basis.

The HE station 504 may use the scanning and/or transition information 1302 to determine when to begin scanning for an HE AP 502 to transition to and/or to determine when to transition to a new HE AP 502.

Figure 14:
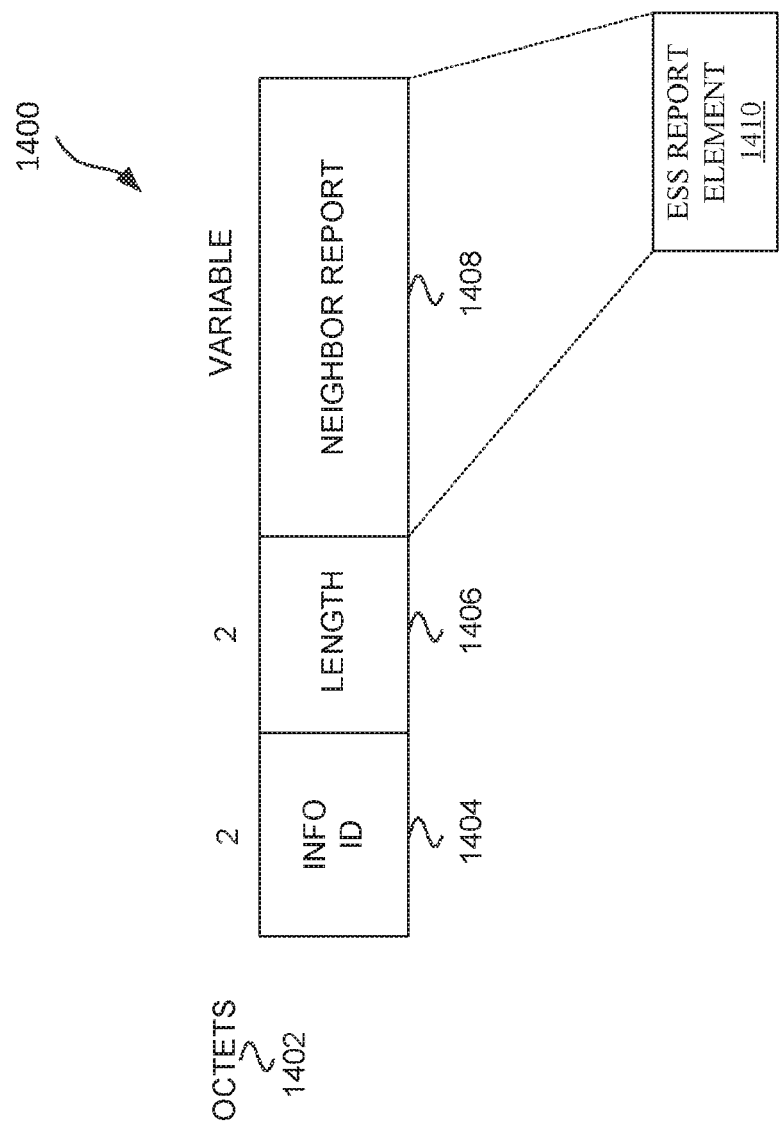
FIG. 14 illustrates a neighbor report in accordance with some embodiments.

FIG. 14 illustrates a neighbor report 1400 in accordance with some embodiments. Illustrated in FIG. 14 is octets 1402, information identification (ID) 1404, length 1406, and neighbor report 1408. The neighbor report 1408 may include a ESS report element 1410 (e.g., 1700). The neighbor report 1400 may be a ANQP neighbor report or BMT response in accordance with some embodiments. The ESS report element 1410 may include recommended/required BSS transition threshold and/or recommended BSS scanning threshold on a per ESS, per BSS 810, per HE AP 502 basis, or on another basis (e.g., per neighbor report 1408).

FIG. 15 illustrates an HE station 504 in accordance with some embodiments. Illustrated in FIG. 15 is HE station 504, ESS report element 1502, neighbor report 1504, current AP RSSI 1506, target APs RSSIs 1508, BSSID 1510, ESS ID 1512, BSS transition threshold 1514, BSS scanning threshold 1516, scan 1518, and transition 1520. The HE station 504 may determine or receive one or more of ESS report elements 1502, neighbor reports 1504, current AP RSSI 1506, and target APs RSSIs 1508, and determine a BSS transition threshold 1514 and BSS scanning threshold 1516 to use. The HE station 504 may determine when to scan 1518 for a HE AP 502 to transition to and when to transition 1520 to a new HE AP 502 based on the BSS transition threshold 1514, BSS scanning threshold 1516, current AP RSSI 1506, and/or target APs RSSIs 1508. The BSSID 1510 may be an ID of the HE AP 502 of the current BSS (e.g., 810) that the HE station 504 is associated with. The ESS ID 1512 may be an ID of an ESS (e.g., 850) as described herein. The ESS report element 1502 may be the same or similar to ESS report element 1700. The neighbor report 1504 may be information as described herein associated with a neighbor report (e.g., 1400). The current AP RSSI 1506 may be a measured RSSI from signals from the HE AP 502 that the HE station 504 is associated with (e.g., 902.1 through 902.4, 1002.1 through 1002.4). In some embodiments, the current AP RSSI 1506 may be based on signals from a beacon frame from the HE AP 502 with which the HE station 504 is associated (e.g., HE AP 502.2 of FIGS. 9 and 10).

The Target APs RSSIs 1508 may be measured RSSIs from signals from one or more HE APs 502 that the HE station 504 receives signals from and is not associated with (e.g., 902.5, 1002.5). In some embodiments, the Target APs RSSIs 1508 may be based on signals from beacon frames from the one or more HE APs 502 with which the HE station 504 is not associated (e.g., HE AP 502.2 of FIGS. 9 and 10).

The HE station 504 may determine a BSS transition threshold 1514 and/or BSS scanning threshold 1516 based on whether a target AP is part of a same ESS, which may be identified by the ESS ID 1512. The HE station 504 may determine a BSS transition threshold 1514 and/or BSS scanning threshold 1516 based on whether the current AP is on an edge of a ESS (e.g., edge of ESS 1806, 1906, 2004). For example, HE station 504 may be associated with HE AP 502.4 (see FIG. 8) and HE station 504 may be moving towards BSS 500.8, The HE station 504 may determine to scan and/or transition at lower RSSIs levels since BSS 500.4 is at an edge of the ESS 1 850.1 (e.g., to stay within ESS 1 850.1 for as long as possible). The HE station 504 may determine a BSS transition threshold 1514 and/or BSS scanning threshold 1516 based on whether the Current AP and/or Target AP are is part of a managed BSS/ESS or planned BSS/ESS (e.g., managed ESS 1804, 1904, 2002).

Figure 16:
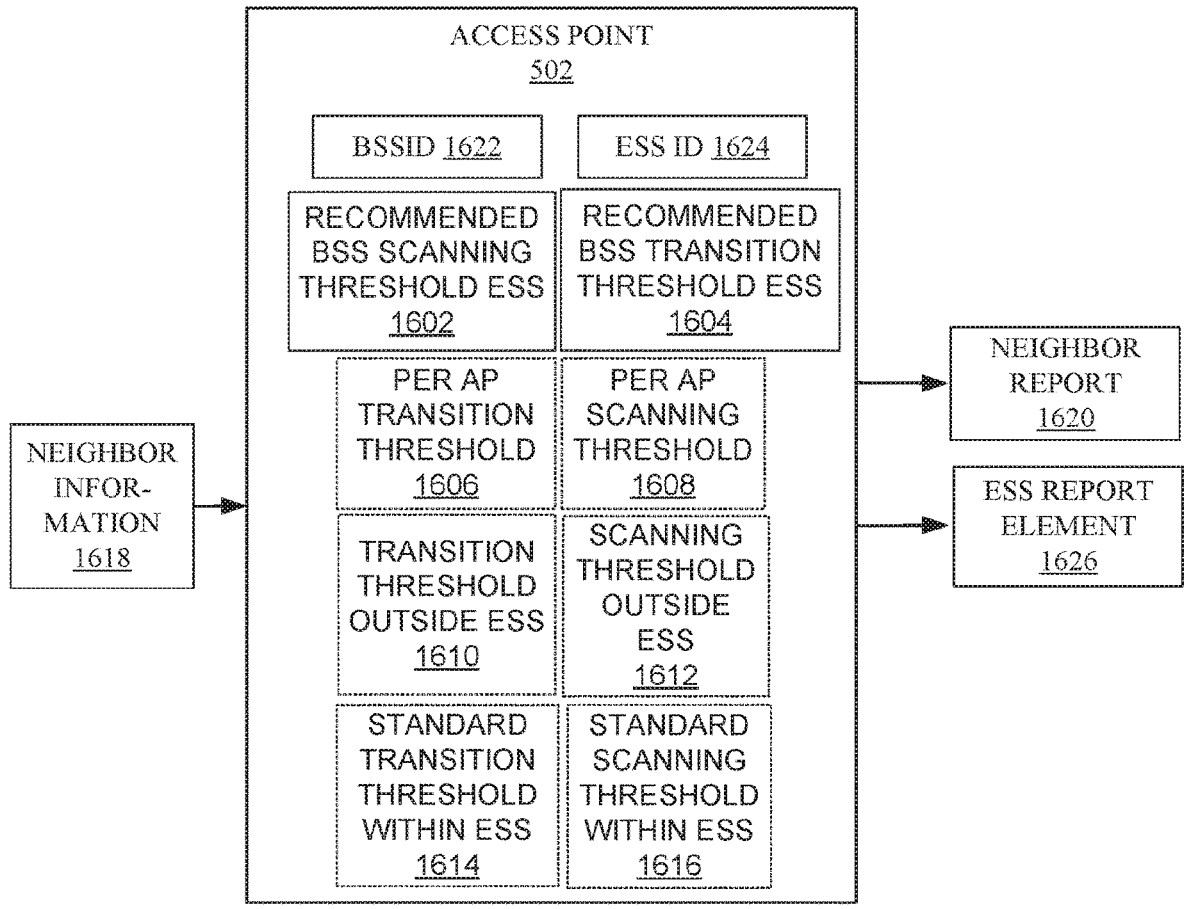
FIG. 16 illustrates an HE access point (AP) in accordance with some embodiments.

FIG. 16 illustrates an HE access point (AP) 502 in accordance with some embodiments. Illustrated in FIG. 16 is neighbor information 1618, BSSID 1622, ESS ID 1624, recommended BSS scanning threshold ESS 1602, recommended BSS transition threshold ESS 1604, per AP transition threshold 1606, per AP scanning threshold 1608, transition threshold outside ESS 1610, scanning threshold outside ESS 1612, standard transition threshold within ESS 1614, standard scanning threshold within ESS 1616, neighbor report 1620, and ESS report element 1626. The neighbor information 1618 may be information regarding neighbors of the HE AP 502, e.g., information from an ESS, information based on received signals, information from other HE APs 502, information from HE stations 504, etc. The BSSID 1622 may be a BSSID as described herein. The ESS ID 1624 may be a ESS ID as described herein. The recommended BSS scanning threshold ESS 1602 may be a recommended scanning threshold for HE APs 502 with a same ESS as the HE AP 502 the HE station 504 is associated with. The recommended BSS transition threshold ESS 1604 may be a recommended BSS transition threshold for HE APs 502 that are within a same ESS as the HE AP 502.

The per AP transition threshold 1606 may be a threshold for a particular HE AP 502 that may be sent in a neighbor report (e.g., 1400, 1620). The per AP scanning threshold 1608 may be threshold for a particular HE AP 502 that may be sent in a neighbor report (e.g., 1400, 1620). The transition threshold outside ESS 1610 may be a threshold for use with HE APs 502 that are in a different ESS as the HE AP 502 the HE station 502 is associated with. The scanning threshold outside ESS 1612 may be a threshold for use with HE APs 502 that are in a different ESS as the HE AP 502 the HE station 502 is associated with.

The standard transition threshold within ESS 1614 may be a threshold for the HE station 504 to use for HE APs 502 within the same ESS as the HE AP 502 that the HE station 504 is associated with. The standard scanning threshold within ESS 1616 may be a threshold for the HE station 504 to use for HE APs 502 within the same ESS as the FIE AP 502 that the HE station 504 is associated with.

The neighbor report 1620 may be a neighbor report as described herein, e.g., 1400. The ESS report element 1626 may be a ESS report element 1626 as described herein, e.g., 1700. The HE AP 502 may send any of the information described herein to a HE station 504.

The HE AP 502 may determine or receive one or more of: recommended BSS scanning threshold ESS 1602, recommended BSS transition threshold ESS 1604, per AP transition threshold 1606, per AP scanning threshold 1608, transition threshold outside ESS 1610, scanning threshold outside ESS 1612, standard transition threshold within ESS 1614, and standard scanning threshold within ESS 1616. In some embodiments, the HE AP 502 is configured to determine one or more of 1602, 1604, 1606, 1608, 1610, 1612, 1614, and 1116 based on measure received signals from neighboring APs. For example, HE AP 502.1 of FIGS. 9 and 10 may determine one or more of 1602, 1604, 1606, 1608, 1610, 1612, 1614, and 1116 based on a signal strength of HE AP 502.2 received at HE AP 502.1. For example, one or more of 1602, 1604, 1606, 1608, 1610, 1612, 1614, and 1116 may be set to a value of a RSSI of a packet of HE AP 502.2 plus or minus a constant value.

Figure 17:
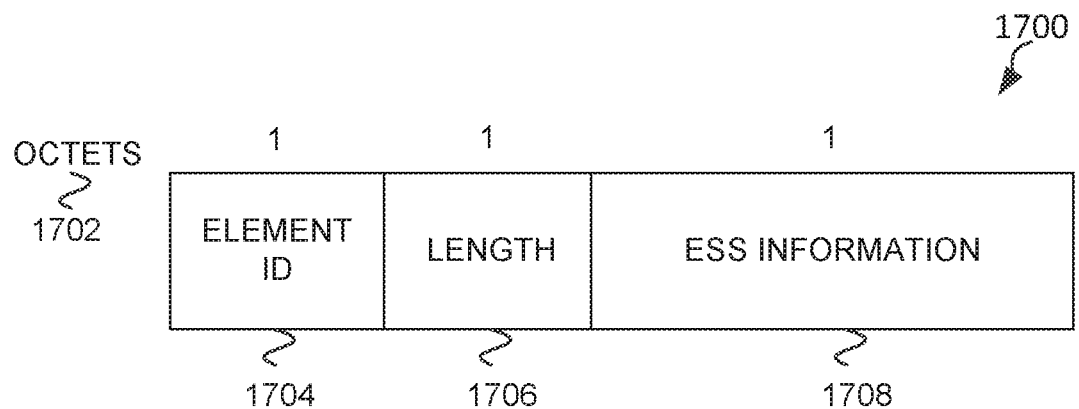
FIG. 17 illustrates an extended service set (ESS) report element in accordance with some embodiments.

FIG. 17 illustrates an extended service set (ESS) report element 1700 in accordance with some embodiments. The ESS report element 1700 may be the same or similar to ESS report element 1206, 1304, and 1410. The ESS report element 1700 may include element ID 1704, length 1706, and ESS information 1708. The element ID 1704 may include one or more fields that indicate the element ID. The length 1706 may indicate a length of the ESS report element 1700. The ESS information 1708 may be information regarding scanning and/or transition thresholds, e.g., 1800, 1900, and/or 2000.

Figure 18:
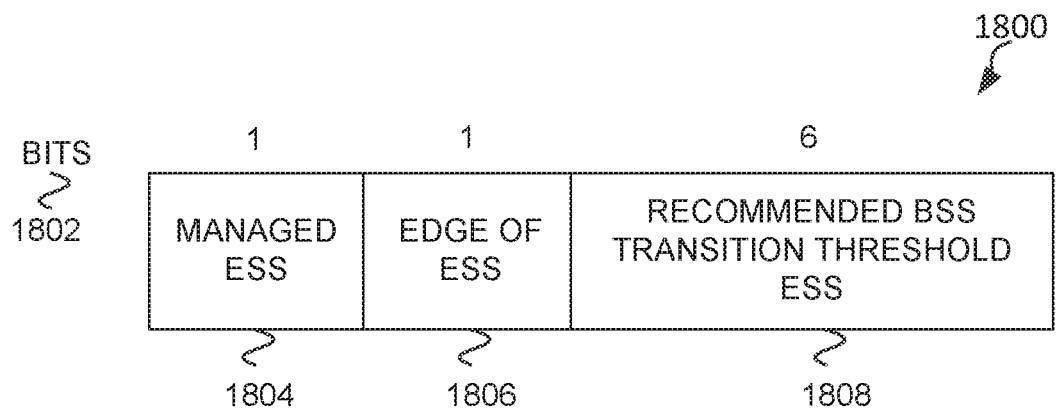
FIG. 18 illustrates ESS information in accordance with some embodiments.

FIG. 18 illustrates ESS information 1800 in accordance with some embodiments. ESS information 1800 may be the same or similar as ESS information 1700. ESS information 1800 may include managed (or planned) ESS field 1804, edge of field ESS 1806, and recommended BSS transition threshold field ESS 1808. Bits 1802 may indicate a number of bits for the fields. The managed ESS 1804 field 1804 may indicate whether the HE AP 502 transmitting the ESS information 1800 is part of a managed or planned ESS (e.g., ESS 1 850.1).

The recommended BSS transition threshold ESS field 1808 may indicate a recommended threshold for HE stations 504 to transition to initiate a BSS transition when a measured RSSI of a beacon from the existing (e.g., the HE AP 502 with which the HE station 504 is associated with) HE AP 502 falls below (or in some embodiments is equal to or less than) the recommended threshold. In some embodiments, if the managed ESS 1804 indicates the ESS is not managed or that the HE AP 504 is not part of an ESS, then the recommended BSS transition threshold ESS field 1808 may be reserved or may not indicate a recommended threshold. The edge of ESS 1806 may indicate whether the HE AP 502 transmitting the ESS information 1800 is on the edge of an ESS (e.g., HE AP 502.4 of FIG. 8). The recommended BSS transition threshold ESS field 1808 may have a value between −20 dBm and −100 dBm, e.g., between −38 dBm and −100 dBm and may be represented with a 1 dMm increment per value of the recommended BSS transition threshold ESS field 1808.

Figure 19:
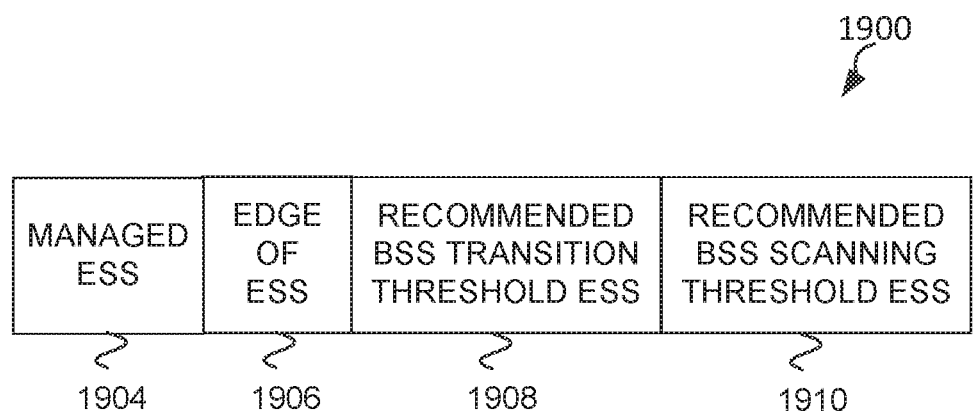
FIG. 19 illustrates ESS information in accordance with some embodiments.

FIG. 19 illustrates ESS information 1900 in accordance with some embodiments. ESS information 1900 may be the same or similar as ESS information 1700. ESS information 1900 may include managed ESS field 1904, edge of field ESS 1906, recommended BSS transition threshold ESS field 1908, and recommended BSS scanning threshold ESS field 1910. The managed ESS 1904 may be the same or similar to managed ESS 1804. Edge of ESS 1906 may be the same or similar to edge of ESS 1806.

The recommended BSS transition threshold ESS field 1908 may be the same or similar to recommended BSS transition threshold ESS field 1808. The recommended BSS scanning threshold ESS field 1908 may indicate a recommended threshold for HE stations 504 to start to scan for a HE AP 502 to transition to when a measured RSSI of a beacon from the existing HE AP 502 falls below (or is equal to or below) the recommended threshold. In some embodiments, if the managed ESS field 1904 indicates the ESS is not managed or that the HE AP 504 is not part of an ESS, then the recommended BSS scanning threshold ESS field 1908 may be reserved or may not indicate a recommended threshold. Recommended BSS transition threshold ESS field 1908, and recommended BSS scanning threshold ESS field 1910 may have a value between −20 dBm and −100 dBm, e.g., between −38 dBm and −100 dBm and may be represented with a 1 dMm increment per value of the recommended BSS transition threshold ESS field 1808. The number of bits for the fields of 1900 may be 1 bit for managed ESS field 1904, one bit for edge of ESS field 1906, 6 bits for recommended BSS transition threshold ESS field 1908, and 6 bits for recommended BSS scanning threshold ESS field 1910.

FIG. 20 illustrates ESS information 2000 in accordance with some embodiments. ESS information 2000 may be the same or similar as ESS information 1700. ESS information 2000 may include one or more of the following fields: managed ESS field 2002, edge of field ESS 2004, per AP transition threshold field 2006, per AP scanning threshold field 2008, transition threshold outside ESS field 2010, scanning threshold outside ESS 2012, standard transition threshold within ESS field 2014, and standard scanning threshold within ESS 2016.

Managed ESS 2002 may be the same or similar to managed ESS 1804 and/or 1904. Edge of ESS 2004 may be the same or similar to edge of ESS 1806 and/or 1906.

Per AP transition threshold field 2006 may indicate a recommended threshold for HE stations 504 to start to transition to a new HE AP 502 when the beacon RSSI from the existing HE AP 502 falls below the threshold indicated by the per AP transition threshold field 2006. Per AP transition threshold field 2006 may be associated with an HE AP 502 from a neighbor report, e.g., 1204, 1302, and 1400. Per AP transition threshold field 2006 may be the same or similar as per AP transition threshold field 1606. In some embodiments, if the managed ESS 2002 indicates the ESS is not managed or that the HE AP 504 is not part of an ESS, then the per AP transition threshold field 2006 may be reserved or may not indicate a recommended threshold.

Per AP scanning threshold field 2008 may indicate a recommended threshold for HE stations 504 to start to scan for new HE APs 502 when the beacon RSSI from the existing HE AP 502 falls below the threshold indicated by the per AP scanning threshold field 2008. Per AP scanning threshold field 2008 may be associated with an HE AP 502 from a neighbor report, e.g., 1204, 1302, and 1400. Per AP scanning threshold field 2008 may be the same or similar as per AP scanning threshold field 1608. In some embodiments, if the managed ESS 2002 indicates the ESS is not managed or that the HE AP 504 is not part of an ESS, then the per AP scanning threshold field 2008 may be reserved or may not indicate a recommended threshold.

Transition threshold outside ESS field 2010 may indicate a recommended threshold for HE stations 504 to start to transition to another HE AP 502 when the beacon RSSI from the existing HE AP 502 falls below the threshold indicated by the transition threshold outside ESS field 2010. The threshold may be for HE APs 502 outside an ESS (e.g., an ESS of the HE AP 502 that the HE station 504 is associated with or received the transition threshold outside ESS field 2010 from). Transition threshold outside ESS field 2010 may be the same or similar as transition threshold outside ESS 1610.

Scanning threshold outside ESS field 2012 may indicate a recommended threshold for HE stations 504 to start to scan for another HE AP 502 when the beacon RSSI from the existing HE AP 502 falls below the threshold indicated by the scanning threshold outside ESS field 2010. The threshold may be for HE APs 502 outside an ESS (e.g., an ESS of the HE AP 502 that the HE station 504 is associated with or received the scanning threshold outside ESS field 2012 from). Scanning threshold outside ESS field 2012 may be the same or similar as scanning threshold outside ESS 1612.

Standard transition threshold within ESS field 2014 may indicate a recommended threshold for HE stations 504 to start to transition to another HE AP 502 when the beacon RSSI from the existing HE AP 502 falls below the threshold indicated by the standard transition threshold within ESS field 2014. The threshold may be for HE AP 502 within a ESS (e.g., an ESS of the HE AP 502 that the HE station 504 is associated with or received the standard transition threshold within ESS field 2014 from). Standard transition threshold within ESS 2014 may be the same or similar as standard transition threshold within ESS 1614.

Standard scanning threshold within ESS field 2016 may indicate a recommended threshold for HE stations 504 to start to transition to another HE AP 502 when the beacon RSSI from the existing HE AP 502 falls below the threshold indicated by the standard scanning threshold within ESS field 2016. The threshold may be for HE AP 502 within a ESS (e.g., an ESS of the HE AP 502 that the HE station 504 is associated with or received the standard scanning threshold within ESS field 2016 from). Standard scanning threshold within ESS 2016 may be the same or similar as standard scanning threshold within ESS 1616.

Per AP transmition threshold field 2006, per AP scanning threshold field 2008, transition threshold outside ESS field 2010, scanning threshold outside ESS 2012, standard transition threshold within ESS field 2014, and standard scanning threshold within ESS field 2016 may each have a value between −20 dBm and −100 dBm, e.g., between −38 dBm and −100 dBm and may be represented with a 1 dMm increment per value of the recommended BSS transition threshold ESS field 1808.

Figure 21:
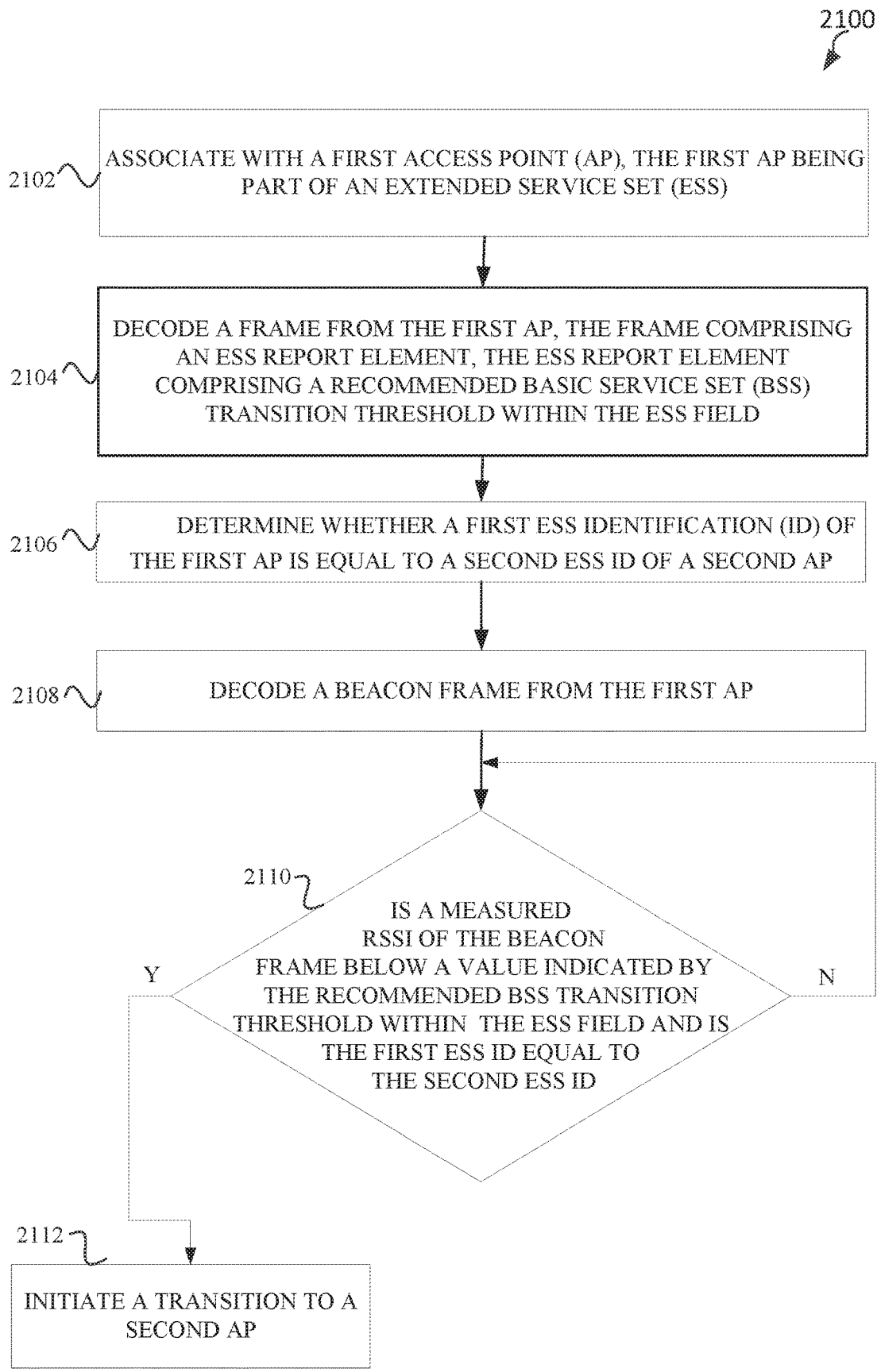
FIG. 21 illustrates a method of a RSSI threshold for transitions in accordance with some embodiments.

FIG. 21 illustrates a method 2100 of a RSSI threshold for transitions in accordance with some embodiments. The method 2100 begins at operation 2102 with associating with a first AP, the first AP being part of an ESS. For example, HE station 504 of FIG. 12 may associate with HE AP 502 at operation 1202. HE station 504 of FIG. 9 may associate with HE AP 502.1 or 502.2. HE station 504 of FIG. 10 may associate with HE AP 502.1 or 502.2. HE station 504 of FIG. 13 may associate with HE AP 502. HE station 504 of FIG. 15 may associate with HE AP 502 of FIG. 16.

The method 2100 continues at operation 2104 with decoding a frame from the first AP, the frame comprising an ESS report element, the ESS report element comprising a recommended BSS transition threshold within the ESS field. For example, HE station 504 of FIG. 12 may decode ESS report element 1206, or HE station 504 may decode ESS report element 1304. HE station 504 of FIG. 15 may decode ESS report element 1502. The ESS report element 1206, 1304, and/or 1502 may be the same or similar as ESS report element 1700. ESS report element 1700 may include ESS information 1708, which may include recommended BSS transition threshold ESS field 1808.

The method 2100 continues at operation 2106 with determining whether a first ESS ID of the first AP is equal to a second ESS ID of a second AP. For example, HE station 504 of FIG. 15 may determine whether a ESS ID 1512 is the same as ESS ID 1624. In some embodiments, the HE station 504 may determine whether the HE AP 502 is in a same ESS 850 as the HE station 504 based on other information, e.g., a color (not illustrated).

The method 2100 continues at operation 2108 with decoding a beacon frame from the first AP. For example, HE station 504 of FIG. 12 may decode a beacon frame 1204. HE station 504 may decode beacon 1302. HE station 504 of FIG. 15 may decode a beacon frame and determine current AP RSSI 1506.

The method 2100 continues at operation 2110 with is a measured RSSI of the beacon frame being below a value indicated by the recommended BSS transition threshold within the ESS field, and is the first ESS ID equal to the second ESS ID. For example, HE station 504 of FIG. 12 may determine the RSSI of a beacon frame 1204. HE station 504 may determine a RSSI of beacon 1302. HE station 504 of FIG. 15 may determine current AP RSSI 1506 of a beacon frame. The HE station 504 may then compare the measured RSSI with the value indicated by the recommended BSS transition threshold within the ESS field. In some embodiments, the value indicated by the recommended BSS transition threshold within the ESS field may be adjusted, e.g., multiplied by a constant or a proportion based on the measured RSSI of the beacon and/or the recommended BSS transition threshold within the ESS field, and/or a constant value added or subjected.

The method 2100 continues at returning to operation 2110 if the measure RSSI of the beacon frame is not below the value indicated by the recommended BSS transition threshold within the ESS field or the first ESS ID is not equal to the second ESS ID. The method 2100 may continue with a different operation in accordance with some embodiments.

The method 2100 continues at operation 2112 with initiating a transition to a second AP. For example, HE station 504 of FIG. 9 may initiate a transition to HE AP 502.2. HE station 504 of FIG. 10 may initiate a transition to HE AP 502.2. HE station 504 of FIG. 12 may initiate a transition to a second AP (not illustrated). HE station 504 of FIG. 13 may initiate a transition to a second AP (not illustrated). HE station 504 of FIG. 15 may initiate a transition to a second AP (not illustrated).

The method 2100 may include one or more additional operations and may not include all the operations described above. Additionally, method 2100 may be performed by an apparatus of a HE station 504, an apparatus of a HE AP 502, a HE station 504, and/or a HE AP 502. Moreover, the order of the operations may be different.

Figure 22:
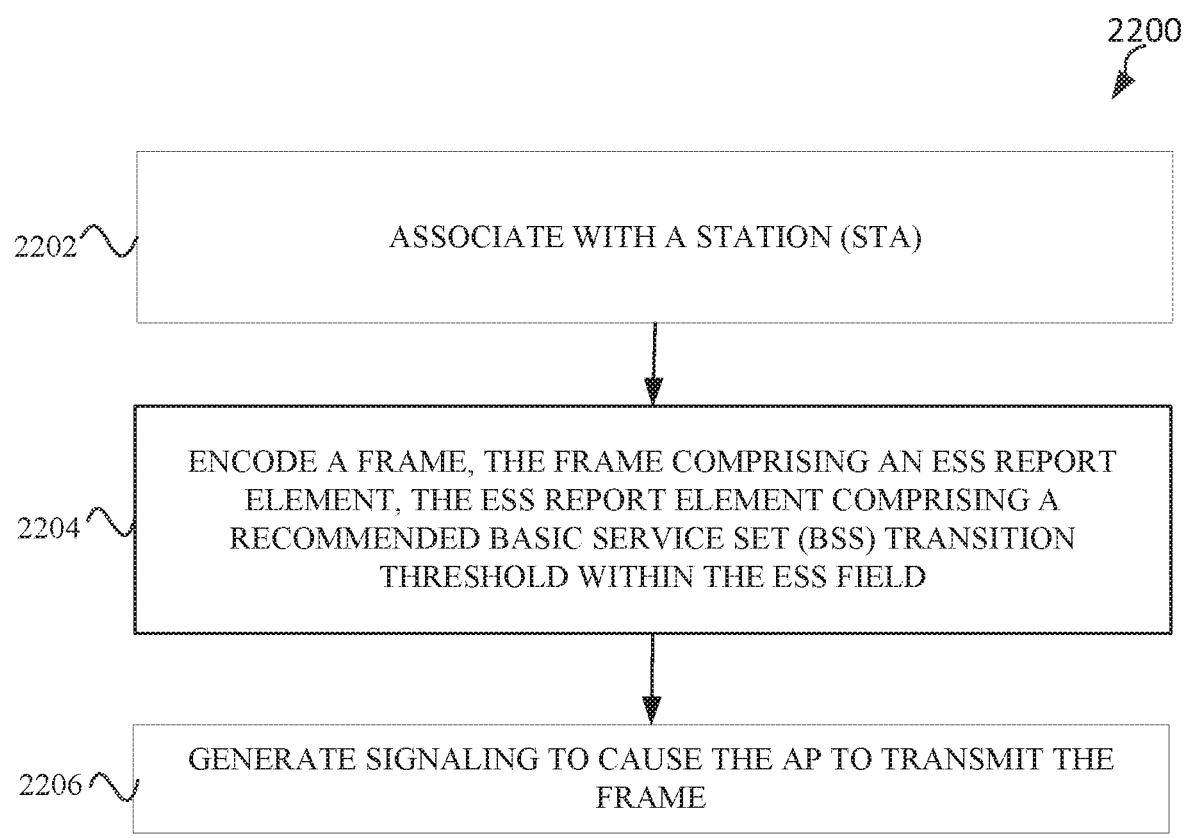
FIG. 22 illustrates a method of a RSSI threshold for transitions in accordance with some embodiments.

FIG. 22 illustrates a method 2200 of a RSSI threshold for transitions in accordance with some embodiments. The method 2200 begins at operation 2202 with associating with a STA. For example, HE AP 502.1, 502.2, 502.3, or 502.4 of FIG. 8 may associate with a HE station 504 (not illustrated). HE AP 502.1 or 502.2 of FIG. 9 may associate with HE station 504. HE AP 502.1 or 502.2 of FIG. 10 may associate with HE station 504. HE AP 502 of FIG. 12 may associate with HE station 504 at operation 1204 or another operation not illustrated. HE AP 502 of FIG. 13 may associate with HE station 504 at operation 1302 or another operation not illustrated. HE AP 502 of FIG. 16 may associate with HE station 504 of FIG. 15.

The method 2200 may continue at operation 2204 with encoding a frame, the frame including an ESS report element, the ESS report element comprising a recommended BSS transition threshold within the ESS field. For example, HE AP 502.1, 502.2, 502.3, or 502.4 of FIG. 8 may encode ESS report element 1700. HE AP 502.1 or 502.2 of FIG. 9 may encode ESS report element 1700. HE AP 502.1 or 502.2 of FIG. 10 may encode ESS report element 1700. HE AP 502 of FIG. 12 may encode ESS report element 1206. HE AP 502 of FIG. 13 may encode ESS report element 1304. HE AP 502 of FIG. 16 may encode ESS report element 1626. ESS report element 1700 may include ESS information 1708, which may include recommended BSS transition threshold ESS field 1808.

The method 2200 may continue at operation 2206 with generating signaling to cause the AP to transmit the frame. For example, an apparatus of HE AP 502.1, 502.2, 502.3, or 502.4 of FIG. 8 may generate signaling to cause the HE AP 502 to transmit the ESS report element 1700. An apparatus of HE AP 502.1 or 502.2 of FIG. 9 may generate signaling to cause the HE AP 502 to transmit the ESS report element 1700. An apparatus of HE AP 502.1 or 502.2 of FIG. 10 may generate signaling to cause the HE AP 502 to transmit ESS report element 1700. An apparatus of HE AP 502 of FIG. 12 may generate signaling to cause the HE AP 502 to transmit the ESS report element 1206. An apparatus of HE AP 502 of FIG. 13 may generate signaling to cause the HE AP 502 to transmit the ESS report element 1304. An apparatus of HE AP 502 of FIG. 16 may generate signaling to cause the HE AP 502 to transmit the ESS report element 1626.

The method 2200 may include one or more additional operations and may not include all the operations described above. Additionally, method 2200 may be performed by an apparatus of a HE station 504, an apparatus of a HE AP 502, a HE station 504, and/or a HE AP 502. Moreover, the order of the operations may be different.

The following examples pertain to further embodiments. Specifics in the examples may be used in one or more embodiments. Example 1 is an apparatus of a STA, the apparatus including memory; and processing circuitry coupled to the memory, the processing circuity configured to: associate with a first access point (AP), the first AP being part of an ESS; decode a frame from the first AP, the frame including an ESS report element, the ESS report element including a recommended basic service set (BSS) transition threshold within the ESS field; decode a beacon frame from the first AP; and determine whether a first ESS ID of the first AP is equal to a second ESS ID of a second AP; in response to a measured received signal strength indicator (RSSI) of the beacon frame being below a value indicated by the recommended BSS transition threshold within the ESS field, and the first ESS ID being equal to the second ESS ID, initiate a transition to the second AP.

In Example 2, the subject matter of Example 1 optionally includes where the ESS report element further includes a planned ESS field, the planned ESS field indicating if the first AP is part of a planned ESS with several BSSs overlapping one another.

In Example 3, the subject matter of Example 2 optionally includes where the ESS report element includes an edge of ESS field, the edge of ESS field indicating whether the first AP is at an edge of the ESS.

In Example 4, the subject matter of any one or more of Examples 1-3 optionally where the value indicated by the recommended BSS transition threshold within the ESS field is between −100 dBm and −38 dBm.

In Example 5, the subject matter of any one or more of Examples 3-4 optionally include where the planned ESS field is 1 bit, the edge of ESS field is 1 bit, and the recommended BSS transition threshold within ESS field is 6 bits.

In Example 6, the subject matter of any one or more of Examples 1-5 optionally include where initiate the transition to the second AP further includes: scan for APs to associate with; and determine to initiate the transition to the second AP based on a second measured RSSI of a second frame, the second frame from the second AP.

In Example 7, the subject matter of any one or more of Examples 1-6 optionally include where the frame is one of the following group: a second beacon frame, association response frame, re-association response frame, and probe response frame.

In Example 8, the subject matter of any one or more of Examples 1-7 optionally include where initiate the transition includes associating with the second AP and disassociating with the first AP.

In Example 9, the subject matter of any one or more of Examples 1-8 optionally include where the ESS report element further includes an indication if the first AP is part of a planned ESS with several BSS overlapping one another, and where the in response to the measured RSSI further includes: in response to the measured RSSI of the beacon frame being below the value indicated by the recommended BSS transition threshold within the ESS field and the first AP is part of the planned ESS, and the first ESS ID being equal to the second ESS ID, initiate a transition to the second AP.

In Example 10, the subject matter of Example 9 optionally includes where the ESS report element includes an indication if the first AP is at an edge of the ESS, and where in response to the measured RSSI further includes: in response to the measured RSSI of the beacon frame being below the value indicated by the recommended BSS transition threshold within the ESS field and the first AP is not at the edge of the ESS, and the first ESS ID being equal to the second ESS ID, initiate a transition to the second AP.

In Example 11, the subject matter of Example 10 optionally includes where the processing circuitry is further configured to: use a lower value than the value indicated by the recommended BSS transition threshold field, if the first AP is at the edge of the ESS.

In Example 12, the subject matter of any one or more of Examples 1-11 optionally include where the processing circuitry is further configured to: in response to the measured RSSI of the beacon frame being below the value indicated by the recommended BSS transition threshold within the ESS field minus a constant value, initiate a scanning for APs for the STA to transition to, and discover the second AP based on the scanning.

In Example 13, the subject matter of any one or more of Examples 1-12 optionally include where the STA, first AP, and the second AP are each one of the following group: an Institute of Electrical and Electronic Engineers (IEEE) 802.11ax access point, an IEEE 802.11ax station, an IEEE 802.11 station, and an IEEE 802.11 access point.

In Example 14, the subject matter of any one or more of Examples 1-13 optionally include transceiver circuitry coupled to the processing circuitry; and one or more antennas coupled to the transceiver circuitry.

Example 15 is a non-transitory computer-readable storage medium that stores instructions for execution by one or more processors of an apparatus of a STA, the instructions to configure the one or more processors to: associate with a first AP, the first AP being part of an extended service set (ESS); decode a frame from the first AP, the frame including an ESS report element, the ESS report element including a recommended basic service set (BSS) transition threshold within the ESS field; decode a beacon frame from the first AP; and determine whether a first ESS ID of the first AP is equal to a second ESS ID of a second AP; in response to a measured received signal strength indicator (RSSI) of the beacon frame being below a value indicated by the recommended BSS transition threshold within the ESS field, and the first ESS ID being equal to the second ESS ID, initiate a transition to the second AP.

In Example 16, the subject matter of any one or more of Examples 14-15 optionally include where the ESS report element further includes a planned ESS field, the planned ESS field indicating if the first AP is part of a planned ESS with several BSS overlapping one another.

Example 17 is a method performed by an apparatus of a STA, the method including: associating with a first AP, the first AP being part of an ESS; decoding a frame from the first AP, the frame including an ESS report element, the ESS report element including a recommended basic service set (BSS) transition threshold within the ESS field; decoding a beacon frame from the first AP; and determining whether a first ESS ID of the first AP is equal to a second ESS ID of a second AP; in response to a measured RSSI of the beacon frame being below a value indicated by the recommended BSS transition threshold within the ESS field, and the first ESS ID being equal to the second ESS ID, initiating a transition to the second AP.

In Example 18, the subject matter of Example 17 optionally includes where the ESS report element further includes a planned ESS field, the planned ESS field indicating if the first AP is part of a planned ESS with several BSS overlapping one another.

Example 19 is an apparatus of an access point (AP) of an extended service set (ESS), the apparatus including memory; and processing circuitry coupled to the memory, the processing circuity configured to: associate with a STA; encode a frame, the frame including an ESS report element, the ESS report element including a recommended BSS transition threshold within the ESS field; and generate signaling to cause the AP to transmit the frame.

In Example 20, the subject matter of Example 19 optionally includes where the ESS report element further includes a planned ESS field, and where the processing circuitry is configured to: encode the planned ESS field with an indication of whether the AP is part of a planned ESS with several BSS overlapping one another.

In Example 21, the subject matter of any one or more of Examples 19-20 optionally include where the ESS report element includes an indication if the AP is at an edge of the ESS.

In Example 22, the subject matter of any one or more of Examples 19-21 optionally include where the processing circuitry is configured to determine the value indicated by the recommended BSS transition threshold based on measured signals from neighboring APs.

In Example 23, the subject matter of any one or more of Examples 19-22 optionally include where the frame is one of the following group: a beacon frame, association response frame, re-association response frame, and probe response frame.

In Example 24, the subject matter of any one or more of Examples 19-23 optionally include where the STA, and the AP are each one of the following group: an Institute of Electrical and Electronic Engineers (IEEE) 802.11ax access point, an IEEE 802.11ax station, an IEEE 802.11 station, and an IEEE 80111 access point.

In Example 25, the subject matter of any one or more of Examples 19-24 optionally include transceiver circuitry coupled to the processing circuitry; and one or more antennas coupled to the transceiver circuitry.

Example 26 is a non-transitory computer-readable storage medium that stores instructions for execution by one or more processors of an apparatus of an AP of an ESS, the instructions to configure the one or more processors to: associate with a STA; encode a frame, the frame including an ESS report element, the ESS report element including a recommended BSS transition threshold within the ESS field; and generate signaling to cause the AP to transmit the frame.

In Example 27, the subject matter of Example 26 optionally includes where the ESS report element further includes a planned ESS field, and where the processing circuitry is configured to: encode the planned ESS field with an indication of whether the AP is part of a planned ESS with several BSS overlapping one another.

In Example 28, the subject matter of any one or more of Examples 26-27 optionally include where the ESS report element includes an indication if the AP is at an edge of the ESS.

In Example 29, the subject matter of any one or more of Examples 26-28 optionally include where the instructions further configure the one or more processors to determine the value indicated by the recommended BSS transition threshold based on measured signals from neighboring APs.

In Example 30, the subject matter of any one or more of Examples 26-29 optionally include where the frame is one of the following group: a beacon frame, association response frame, re-association response frame, and probe response frame.

In Example 31, the subject matter of any one or more of Examples 26-30 optionally include where the STA, and the AP are each one of the following group: an IEEE 802.11ax access point, an IEEE 802.11ax station, an IEEE 802.11 station, and an IEEE 802.11 access point.

Example 32 is a method perform by an apparatus of an AP of an ESS, the method including: associating with a STA; encoding a frame, the frame including an ESS report element, the ESS report element including a recommended BSS transition threshold within the ESS field; and generating signaling to cause the AP to transmit the frame.

In Example 33, the subject matter of any one or more of Examples 26-32 optionally include where the ESS report element further includes a planned ESS field, and where the processing circuitry is configured to: encode the planned ESS field with an indication of whether the AP is part of a planned ESS with several BSS overlapping one another.

In Example 34, the subject matter of any one or more of Examples 26-33 optionally include where the ESS report element includes an indication if the AP is at an edge of the ESS.

In Example 35, the subject matter of any one or more of Examples 26-34 optionally include where the instructions further configure the one or more processors to determine the value indicated by the recommended BSS transition threshold based on measured signals from neighboring APs.

In Example 36, the subject matter of any one or more of Examples 26-35 optionally include where the frame is one of the following group: a beacon frame, association response frame, re-association response frame, and probe response frame.

In Example 37, the subject matter of any one or more of Examples 26-36 optionally include where the STA, and the AP are each one of the following group: an Institute of Electrical and Electronic Engineers (IEEE) 802.11ax access point, an IEEE 802.11ax station, an IEEE 802.11 station, and an IEEE 802.11 access point.

Example 38 is an apparatus of a STA, the apparatus including: means for associating with a first AP, the first AP being part of an ESS; means for decoding a frame from the first AP, the frame including an ESS report element, the ESS report element including a recommended BSS transition threshold within the ESS field; means for decoding a beacon frame from the first AP; and means for determining whether a first ESS ID of the first AP is equal to a second ESS ID of a second AP; means for in response to a measured RSSI of the beacon frame being below a value indicated by the recommended BSS transition threshold within the ESS field, and the first ESS ID being equal to the second ESS ID, initiating a transition to the second AP.

In Example 39, the subject matter of Example 38 optionally includes where the ESS report element further includes a planned ESS field, the planned ESS field indicating if the first AP is part of a planned ESS with several BSS overlapping one another.

Example 40 is an apparatus of an AP of an extended service set (ESS), the apparatus including: means for associating with a station (STA); means for encoding a frame, the frame including an ESS report element, the ESS report element including a recommended. BSS transition threshold within the ESS field; and means for generating signaling to cause the AP to transmit the frame.

In Example 41, the subject matter of Example 40 optionally includes where the ESS report element further includes a planned ESS field, and where the processing circuitry is configured to: encode the planned ESS field with an indication of whether the AP is part of a planned ESS with several BSS overlapping one another.

In Example 42, the subject matter of any one or more of Examples 40-41 optionally include where the ESS report element includes an indication if the AP is at an edge of the ESS.

In Example 43, the subject matter of any one or more of Examples 40-42 optionally include where the apparatus further including: means for determining the Value indicated by the recommended BSS transition threshold based on measured signals from neighboring APs.

In Example 44, the subject matter of any one or more of Examples 40-43 optionally include where the frame is one of the following group: a beacon frame, association response frame, re-association response frame, and probe response frame.

In Example 45, the subject matter of any one or more of Examples 40-44 optionally include where the STA, and the AP are each one of the following group: an IEEE 802.11ax access point, an IEEE 802.11ax station, an IEEE 802.11 station, and an IEEE 802.11 access point.

The Abstract is provided to comply with 37 C.F.R. Section 1.72(1)) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the apparatus comprising memory; and processing circuitry coupled to the memory, the processing circuitry configured to:
    associate with a first access point (AP), the first AP being part of an extended service set (ESS);
    decode a frame from the first AP, the frame comprising an ESS report element, the ESS report element comprising a recommended basic service set (BSS) transition threshold within an ESS information field, wherein the ESS report element further comprises a planned ESS field, the planned ESS field indicating if the first AP is part of a planned ESS with several BSSs overlapping one another;
    decode a beacon frame from the first AP; determine whether a first ESS identification (ID) of the first AP is equal to a second ESS ID of a second AP; and
    in response to a measured received signal strength indicator (RSSI) of the beacon frame being below a value indicated by the recommended BSS transition threshold within the ESS information field, and the first ESS ID being equal to the second ESS ID, initiate a transition to the second AP.

2. The apparatus of claim 1, wherein the ESS report element comprises an edge of ESS field, the edge of ESS field indicating whether the first AP is at an edge of the ESS.

3. The apparatus of claim 1, wherein the value indicated by the recommended BSS transition threshold within the ESS information field is between −100 dBm and −38 dBm.

4. The apparatus of claim 2, wherein the planned ESS field is 1 bit, the edge of ESS field is 1 bit, and the recommended BSS transition threshold within the ESS information field is 6 bits.

5. The apparatus of claim 1, wherein initiate the transition to the second AP further comprises:
    scan for APs to associate with; and
    determine to initiate the transition to the second AP based on a second measured RSSI of a second frame, the second frame from the second AP.

6. The apparatus of claim 1, wherein the frame is one of the following group: a second beacon frame, association response frame, re-association response frame, and probe response frame.

7. The apparatus of claim 1, wherein initiate the transition comprises associating with the second AP and disassociating with the first AP.

8. The apparatus of claim 1, wherein the ESS report element further comprises an indication if the first AP is part of a planned ESS with several BSS overlapping one another, and wherein the in response to the measured RSSI further comprises:
    in response to the measured RSSI of the beacon frame being below the value indicated by the recommended BSS transition threshold within the ESS information field and the first AP is part of the planned ESS, and the first ESS ID being equal to the second ESS ID, initiate a transition to the second AP.

9. The apparatus of claim 8, wherein the ESS report element comprises an indication if the first AP is at an edge of the ESS, and wherein in response to the measured RSSI further comprises:
    in response to the measured RSSI of the beacon frame being below the value indicated by the recommended BSS transition threshold within the ESS information field and the first AP is not at the edge of the ESS; and the first ESS ID being equal to the second ESS ID, initiate a transition to the second AP.

10. The apparatus of claim 9, wherein the processing circuitry is further configured to:
    use a lower value than the value indicated by the recommended BSS transition threshold field, if the first AP is at the edge of the ESS.

11. The apparatus of claim 1, wherein the processing circuitry is further configured to:
    in response to the measured RSSI of the beacon frame being below the value indicated by the recommended BSS transition threshold within the ESS information field minus a constant value, initiate a scanning for APs for the STA to transition to, and discover the second AP based on the scanning.

12. The apparatus of claim 1, wherein the STA, first AP, and the second AP are each one of the following group: an Institute of Electrical and Electronic Engineers (IEEE) 802.11ax access point, an IEEE 802.11ax station, an IEEE 802.11 station, and an IEEE 802.11 access point.

13. The apparatus of claim 1, further comprising transceiver circuitry coupled to the processing circuitry; and one or more antennas coupled to the transceiver circuitry.

14. A non-transitory computer-readable storage medium that stores instructions for execution by one or more processors of an apparatus of a station (STA), the instructions to configure the one or more processors to:
    associate with a first access point (AP), the first AP being part of an extended service set (ESS);
    decode a frame from the first AP, the frame comprising an ESS report element, the ESS report element comprising a recommended basic service set (BSS) transition threshold within an ESS information field, wherein the ESS report element further comprises a planned ESS field, the planned ESS field indicating if the first AP is part of a planned ESS with several BSSs overlapping one another;
    decode a beacon frame from the first AP;
    determine whether a first ESS identification (ID) of the first AP is equal to a second ESS ID of a second AP; and
    in response to a measured received signal strength indicator (RSSI) of the beacon frame being below a value indicated by the recommended BSS transition threshold within the ESS information field, and the first ESS ID being equal to the second ESS ID, initiate a transition to the second AP.

15. A method performed by an apparatus of a station (STA), the method comprising:
    associating with a first access point (AP), the first AP being part of an extended service set (ESS);

decoding a frame from the first AP, the frame comprising an ESS report element, the ESS report element comprising a recommended basic service set (BSS) transition threshold within at ESS information field, wherein the ESS report element further comprises a planned ESS field, the planned ESS field indicating if the first AP is part of a planned ESS with several BSSs overlapping one another;

decoding a beacon frame from the first AP;

determining whether a first ESS identification (IIS) of the first AP is equal to a second ESS ID of a second AP; and in response to a measured received signal strength indicator (RSSI) of the beacon frame being below a value indicated by the recommended BSS transition threshold within the ESS information field, and the first ESS ID being equal to the second ESS ID, initiating a transition to the second AP.

16. An apparatus of an access point (AP) of an extended service set (ESS), the apparatus comprising memory; and processing circuitry coupled to the memory, the processing circuitry configured to:

associate with a station (STA);

encode a frame, the frame comprising an ESS report element, the ESS report element comprising a recommended basic service set (BSS) transition threshold within an ESS information field and comprising a planned ESS field with an indication of whether the AP is part of a planned ESS with several BSSes overlapping one another; and generate signaling to cause the AP to transmit the frame.

17. The apparatus of claim 16, wherein the ESS report element comprises an indication if the AP is at an edge of the ESS.

18. The apparatus of claim 16, wherein the processing circuitry is configured to determine the value indicated by the recommended BSS transition threshold based on measured signals from neighboring APs.

19. The apparatus of claim 16, wherein the frame is one of the following group: a beacon frame, association response frame, re-association response frame, and probe response frame.

20. The apparatus of claim 16, wherein the STA, and the AP are each one of the following group: an Institute of Electrical and Electronic Engineers (IEEE) 802.11ax access point, an IEEE 802.11ax station, an IEEE 802.11 station, and an IEEE 802.11 access point.

21. The apparatus of claim 16, further comprising transceiver circuitry coupled to the processing circuitry; and one or more antennas coupled to the transceiver circuitry.

* * * * *

UNITED STATES PATENT AND TRADEMARK OFFICE
CERTIFICATE OF CORRECTION

| | |
|---|---|
| PATENT NO. | : 11,350,299 B2 |
| APPLICATION NO. | : 16/496898 |
| DATED | : May 31, 2022 |
| INVENTOR(S) | : Canpolat et al. |

It is certified that error appears in the above-identified patent and that said Letters Patent is hereby corrected as shown below:

In the Claims

In Column 31, Line 34, Claim 1, after "AP;", insert a linebreak

In Column 32, Line 17, Claim 9, delete "ESS;" and insert --ESS,-- therefor

In Column 33, Line 4, Claim 15, delete "at" and insert --an-- therefor

In Column 33, Line 10, Claim 15, delete "(IIS)" and insert --(ID)-- therefor

In Column 34, Line 1, Claim 16, delete "field" and insert --field,-- therefor

Signed and Sealed this
Tenth Day of January, 2023

Katherine Kelly Vidal
*Director of the United States Patent and Trademark Office*